(12) United States Patent
Yu et al.

(10) Patent No.: US 11,434,148 B2
(45) Date of Patent: Sep. 6, 2022

(54) HYDROGEN-CONTAINING TRANSITION METAL OXIDE, METHOD FOR MAKING THE SAME, AND PRIMARY BATTERY

(71) Applicant: Tsinghua University, Beijing (CN)

(72) Inventors: Pu Yu, Beijing (CN); Nian-Peng Lu, Beijing (CN); Jian Wu, Beijing (CN); Shu-Yun Zhou, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 234 days.

(21) Appl. No.: 16/420,144

(22) Filed: May 22, 2019

(65) Prior Publication Data
US 2020/0031685 A1    Jan. 30, 2020

Related U.S. Application Data

(63) Continuation of application No. PCT/CN2017/112667, filed on Nov. 23, 2017.

(30) Foreign Application Priority Data

Nov. 23, 2016 (CN) .......................... 201611046871.2

(51) Int. Cl.
*C01G 51/04* (2006.01)
*H01M 4/485* (2010.01)
*H01M 4/90* (2006.01)

(52) U.S. Cl.
CPC ............ *C01G 51/04* (2013.01); *H01M 4/485* (2013.01); *H01M 4/9033* (2013.01); *C01P 2002/34* (2013.01); *C01P 2006/40* (2013.01)

(58) Field of Classification Search
None
See application file for complete search history.

(56) References Cited

U.S. PATENT DOCUMENTS

| 6,964,827 B2 | 11/2005 | Barker et al. |
| 7,666,550 B2 | 2/2010 | Chia et al. |
| 2007/0085052 A1 | 4/2007 | Lee et al. |

(Continued)

FOREIGN PATENT DOCUMENTS

| CN | 1340213 | 3/2002 |
| CN | 1367546 | 9/2002 |

(Continued)

OTHER PUBLICATIONS

International Search Report of PCT/CN2017/112667.
(Continued)

*Primary Examiner* — Carmen V Lyles-Irving

(57) ABSTRACT

A hydrogen-containing transition metal oxide is provided. The hydrogen-containing transition metal oxide has a structural formula of $ABO_xH_y$, wherein A is one or more of alkaline earth metal elements and rare-earth metal elements, B is one or more of transition metal elements, x is a numeric value in a range of 1 to 3, and y is a numeric value in a range of 0 to 2.5. The present disclosure further provides a primary battery by using the hydrogen-containing transition metal oxide as electrodes and a method for making the hydrogen-containing transition metal oxide.

14 Claims, 24 Drawing Sheets

A

B

(56) References Cited

U.S. PATENT DOCUMENTS

| | | | | |
|---|---|---|---|---|
| 2013/0260224 | A1* | 10/2013 | Hibino | H01M 4/483 429/188 |
| 2014/0128252 | A1* | 5/2014 | Hosono | C01G 23/003 502/350 |
| 2014/0234752 | A1 | 8/2014 | Park et al. | |
| 2015/0148218 | A1 | 5/2015 | Lee et al. | |

FOREIGN PATENT DOCUMENTS

| | | |
|---|---|---|
| CN | 1574215 | 2/2005 |
| CN | 1740377 | 3/2006 |
| CN | 1776912 | 5/2006 |
| CN | 1934033 | 3/2007 |
| CN | 101136453 | 3/2008 |
| CN | 101624206 | 1/2010 |
| CN | 101918337 | 12/2010 |
| CN | 102132408 | 7/2011 |
| CN | 102683348 | 9/2012 |
| CN | 102282098 | 12/2014 |
| CN | 1903423 | 1/2017 |
| EP | 2730542 | 5/2014 |
| EP | 2793279 | 10/2014 |
| JP | 2009054884 | 3/2009 |

OTHER PUBLICATIONS

Topotactic Phase Transformation of the Brownmillerite SrCoO2.5 to the Perovskite SrCoO3-δ, Jeen, H. et al., Advanced Materials, vol. 25, Sep. 19, 2013, ISSN:10935-9648, pp. 3651-3656.
Lim Dae-Kwang et al: "Electrochemical hydrogen charge and discharge properties of La0.1Sr0.9-yFeyO3-[delta] (y=0,0.2,1) electrodes in alkaline electrol", «Ectrochimica Acta» vol. 102, Apr. 17, 2013, pp. 393-339.
Hayward M A et al: "The Hydride Anion in an Extended Transition Metal Oxide Array: LaSrCo0_3H_0.7", arxiv.org, Cornell University Library, 2010LIN Library Cornell University Ithaca, NY 14853. Jul. 27, 2020.
N. Lu et al.: "Electric-filed control tri-phase transformation with a selective dual-ion switch", Nature, [Online] vol. 124, No. 546, Jun. 1, 2017.
Katayama, Tsukasa et al.: "opotactic synthesis of strontium cobalt oxyhydride thin film with perovskite structure" «AIP Advances» vol. 5, 2015.
Takeshi Yajima et al.: "Epitaxial thin films of ATiO3-xHx(A = Ba, Sr, Ca) with metallic conductivity" «Journal of The American Chemical Society» vol. 134, May 7, 2012, pp. 8782-8785.
Takafumi Yamamoto et al.: "An Antiferro-to-Ferromagnetic Transition in EuTiO 3-x H x Induced by Hydride Substitution" «Inorganic Chemistry» vol. 54, Jan. 16, 2015, pp. 1501-1507.
Naoya Masuda et al.: "Hydride in BaTiO2.5H0.5 A Labile Ligand in Solid State Chemistry" «Journal of The American Chemical Society» vol. 137, Jan. 17, 2015, pp. 15351-15321.
Strontium Vanadium Oxide-Hydrides "Square-Planar" Two-Electron Phases «Angew. Chem. Int. Ed.» vol. 53, Jan. 24, 2014, pp. 7556-7559.
Epitaxial Oxygen Getter for a Brownmillerite Phase Transformation in Manganite Films, J. D. Ferguson et al., Advanced Materials, 2011, 23, 1226-1230.
Hybrid density functional calculations of redox potentials and formation energies of transition metal compounds, V. L. Chevrier et al., 2010, Physical Review, B82, 075122.
Crystal structure of brownmillerite Ba2InGaO5, Christophe Didier et al., Journal of Solid State Chemistry 218 (2014) 38-43.
Crystal and magnetic structures of the brownmillerite Ca2Cr2O5, Angel M. Arevalo-Lopez et al., Dalton Trans., 2015, 44, 10661.

\* cited by examiner provide a transition metal oxide having a structural formula of $ABO_z$, wherein z is greater than or equal to 2 and smaller than or equal to 3;

↓ soak the transition metal oxide with an ionic liquid, wherein water in the ionic liquid is capable of being decomposed into hydrogen ions and oxygen ions under an action of an electric field;

↓ apply an electric field to the transition metal oxide to cause the hydrogen ion in the ionic liquid to insert into the transition metal oxide.

HYDROGEN-CONTAINING TRANSITION METAL OXIDE, METHOD FOR MAKING THE SAME, AND PRIMARY BATTERY

CROSS-REFERENCE TO RELATED APPLICATIONS

This application claims all benefits accruing under 35 U.S.C. § 119 from China Patent Application No. 201611046871.2, filed on Nov. 23, 2016 in the State Intellectual Property Office of China, the content of which is hereby incorporated by reference. This application is a continuation under 35 U.S.C. § 120 of international patent application PCT/CN2017/112667 filed on Nov. 23, 2017, the content of which is also hereby incorporated by reference.

TECHNICAL FIELD

The present disclosure relates to material for a battery, in particular to a hydrogen-containing transition metal oxide, a making method thereof, and a primary battery.

BACKGROUND

A thermology method is adopted to hydrogenate an oxide. For example, the oxide can be reduced by some hydrides such as $CaH_2$ and $NaH$. H ions would substitute O of the oxide to form H-M bonds (M is a transition metal). Since the H-M bond is shorter than M-O, the hydrogenated oxide exhibits a characteristic of reduced lattice volume. The hydrogenation to the transition metal oxide, on one hand, changes the lattice structure of the transition metal oxide, and on the other hand, changes an electrical or magnetic property of the material due to the accompanied doping of electron or hole. In addition, the oxygen of the oxide sometimes may be carried away during the hydrogenation so as to form a structural phase with an oxygen vacancy.

Some hydrogen-containing oxides, such as hydrogenated $LaSrCoO_3$, $BaTiO_3$, $VO_2$, $TiO_2$, and the like, have been made. In addition to the hydrogenation method, a structural transition of a material can also be achieved by a thermal oxidation method. For example, a transformation from $SrCoO_{2.5}$ with a brownmillerite structure to $SrCoO_3$ with a perovskite structure can be achieved by a high oxygen pressure oxidation method.

The above methods are all restricted to a regulation between two phases. However, there is no hydrogen-containing transition metal oxide capable of achieving a tri-state phase transformation and no method for regulating the hydrogen-containing transition metal oxide by an electric field to achieve the tri-state phase transformation.

SUMMARY

In view of this, for the problems as described above, it is necessary to provide a hydrogen-containing transition metal oxide, a making method thereof, and a primary battery, wherein a transformation among three phases can be achieved by the hydrogen-containing transition metal oxide.

A hydrogen-containing transition metal oxide is provided. The hydrogen-containing transition metal oxide has a structural formula of $ABO_xH_y$, wherein A is one or more of alkaline earth metal elements and rare-earth metal elements, B is one or more of transition metal elements, x is a numeric value in a range of 1 to 3, and y is a numeric value in a range of 0 to 2.5.

In one embodiment, the alkaline earth metal elements include Be, Mg, Ca, Sr, and Ba; the rare-earth metal elements include La, Ce, Pr, Nd, Pm, Sm, Eu, Gd, Tb, Dy, Ho, Er, Tm, and Yb; and the transition metal elements include Co, Cr, Fe, Mn, Ni, Cu, Ti, Zn, Sc, and V.

In one embodiment, B is transition metal element Co.
In one embodiment, A is alkaline earth metal element Sr.
In one embodiment, x is 2.5 and y is 0 to 2.5.

A method for making a hydrogen-containing transition metal oxide is provided, including steps of:

S100, providing a transition metal oxide having a structural formula of $ABO_z$, wherein z is greater than or equal to 2 and smaller than or equal to 3;

S200, soaking the transition metal oxide with an ionic liquid, wherein water in the ionic liquid is capable of being decomposed into hydrogen ions and oxygen ions under an action of an electric field; and S300, applying an electric field to the transition metal oxide to cause the hydrogen ions in the ionic liquid to insert into the transition metal oxide.

In one embodiment, the step S100 includes steps of:
S110, providing a substrate;
S120, depositing a film of the transition metal oxide having a structural formula of $ABO_z$ onto a surface of the substrate; and
S130, forming a first electrode on a surface of the film of the transition metal oxide.

In one embodiment, the substrate is one of a ceramic substrate, a silicon substrate, a glass substrate, a metal substrate, or a polymer. In the step S120, the film of the transition metal oxide is obtained via an epitaxial growth on the surface of the substrate by using a pulsed laser deposition method.

In one embodiment, in the step S130, the first electrode contacts the film of the transition metal oxide to form a bottom electrode.

In one embodiment, the step S300 includes steps of:
S310, providing a second electrode and a power source;
S320, disposing the second electrode to be spaced from the first electrode, and electrically and respectively connecting the second electrode and the first electrode to the power source;
S330, soaking the second electrode with the ionic liquid and applying an electric field in a direction from the second electrode to the first electrode by the power source.

A primary battery is provided, including a cathode electrode, an anode electrode spaced from the cathode electrode, and an electrolyte disposed between the cathode electrode and the anode electrode, wherein the cathode electrode and the anode electrode are the hydrogen-containing transition metal oxide as described in above embodiments.

In the present disclosure, the hydrogen-containing transition metal oxide with a novel crystal structure and the method for making the same are achieved by an electric field controlled hydrogenation. In combination of the electric field controlled hydrogenation and the electric field controlled oxidization, a controllable transformation under the electric fields among three different structural phases are achieved by using the hydrogen-containing transition metal oxide, and an abundant regulations to the states and the properties of the materials are achieved. In addition, the primary battery using the hydrogen-containing transition metal oxide as electrodes is further provided in the present disclosure.

BRIEF DESCRIPTION OF THE DRAWINGS

FIG. 1 shows a flowchart of a method for making a hydrogen-containing transition metal oxide, provided in embodiments of the present disclosure;

DETAILED DESCRIPTION

Figure 2A:
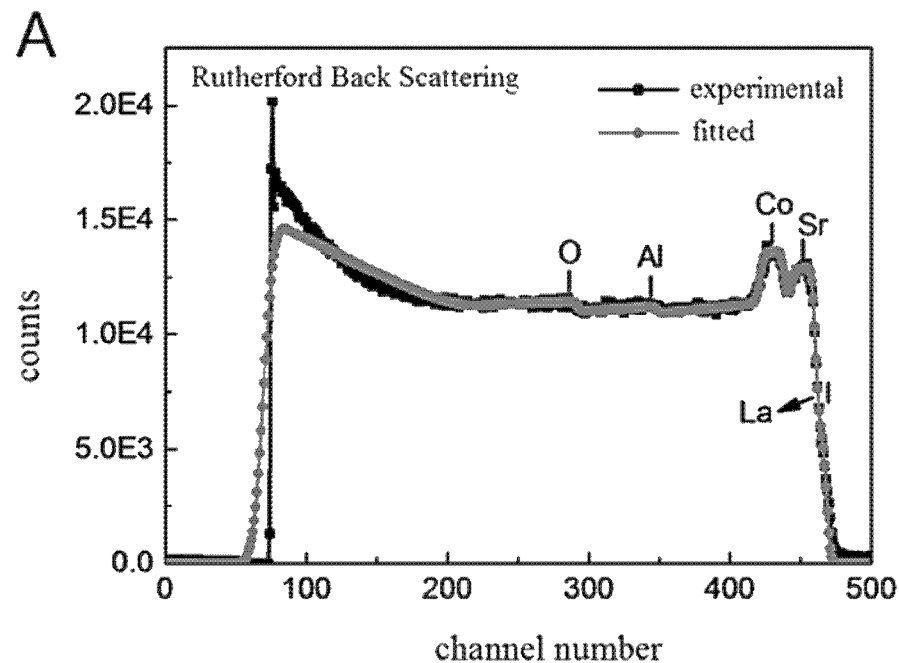
FIG. 2 shows test curves of Rutherford Back Scattering (RBS) and Hydrogen Forward Scattering (HFS) of $SrCoO_{2.8}H_{0.82}$ (A, B), $SrCoO_3H_{1.95}$ (C, D), and $SrCoO_{2.5}H_{2.38}$ (E, F), provided in embodiments of the present disclosure.
Figure 2B:
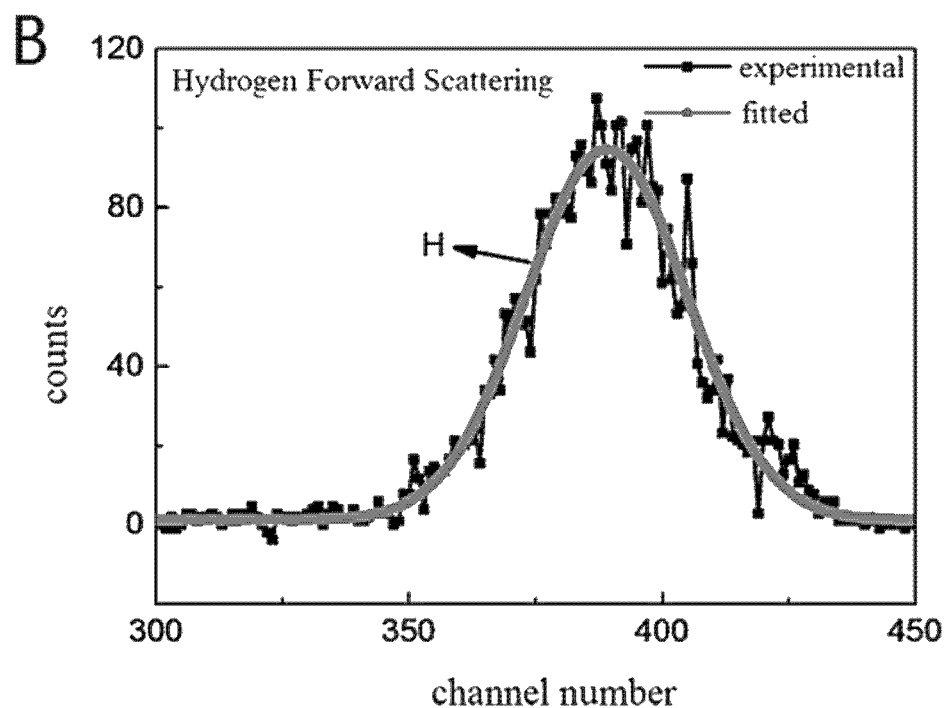
Figure 2C:
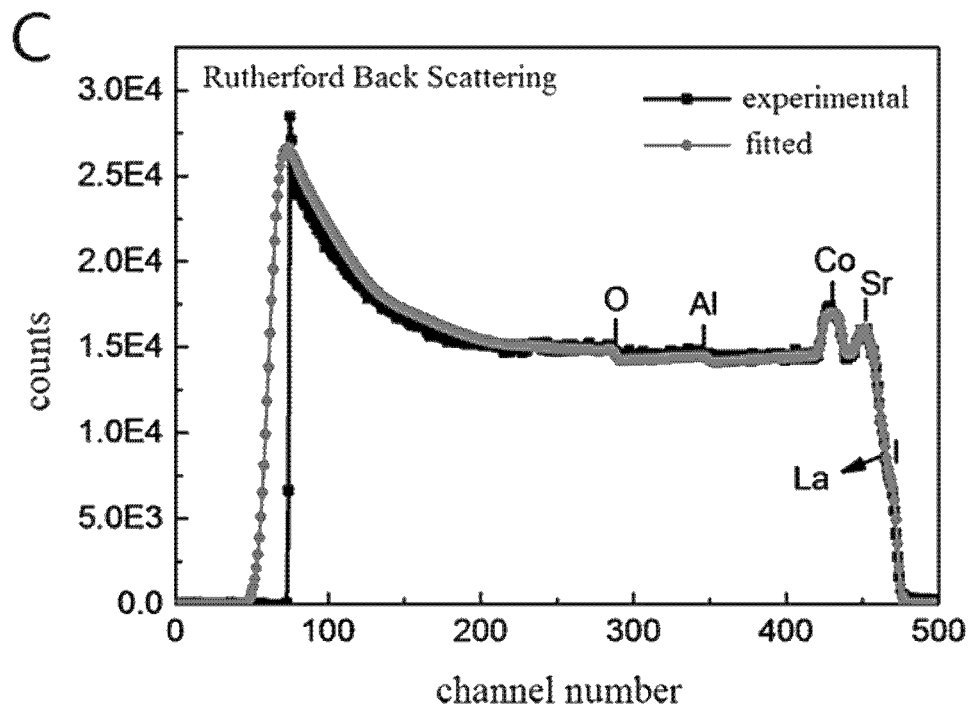
Figure 2D:
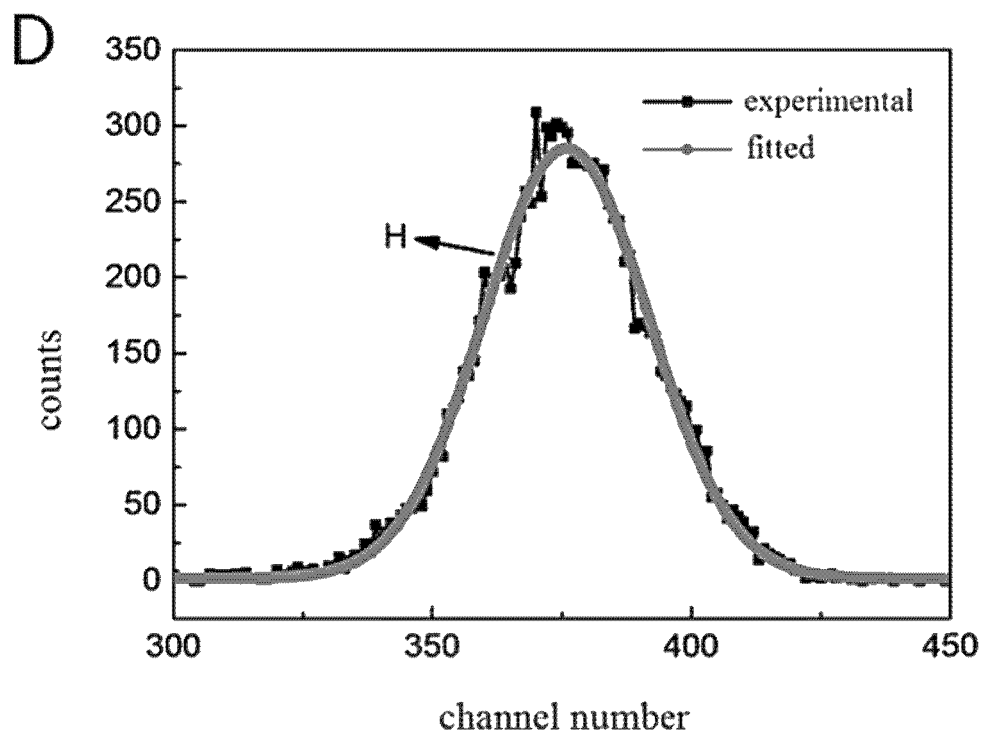
Figure 2E:
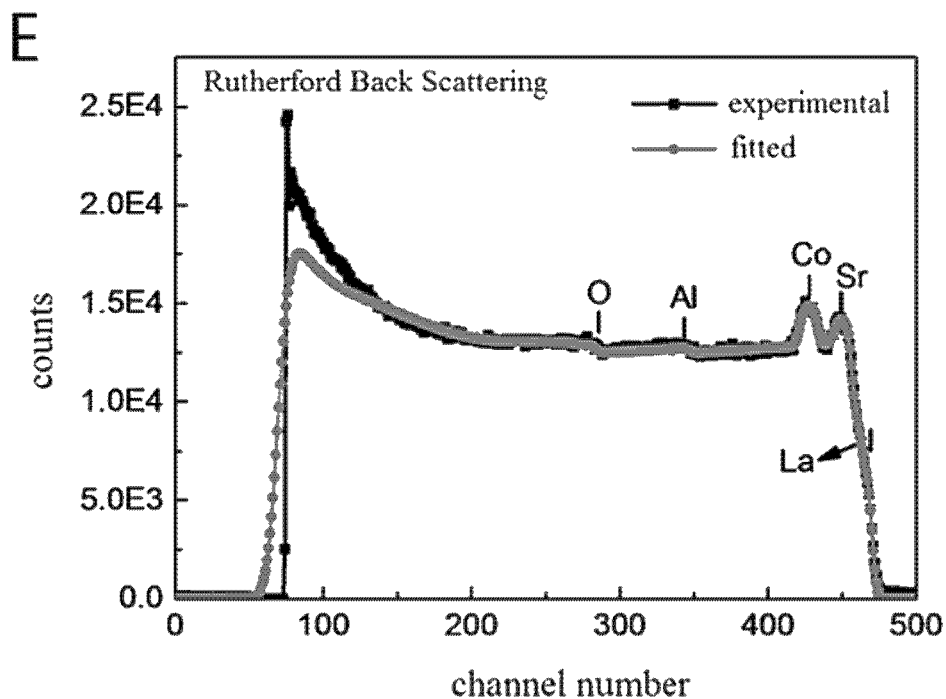
Figure 2F:
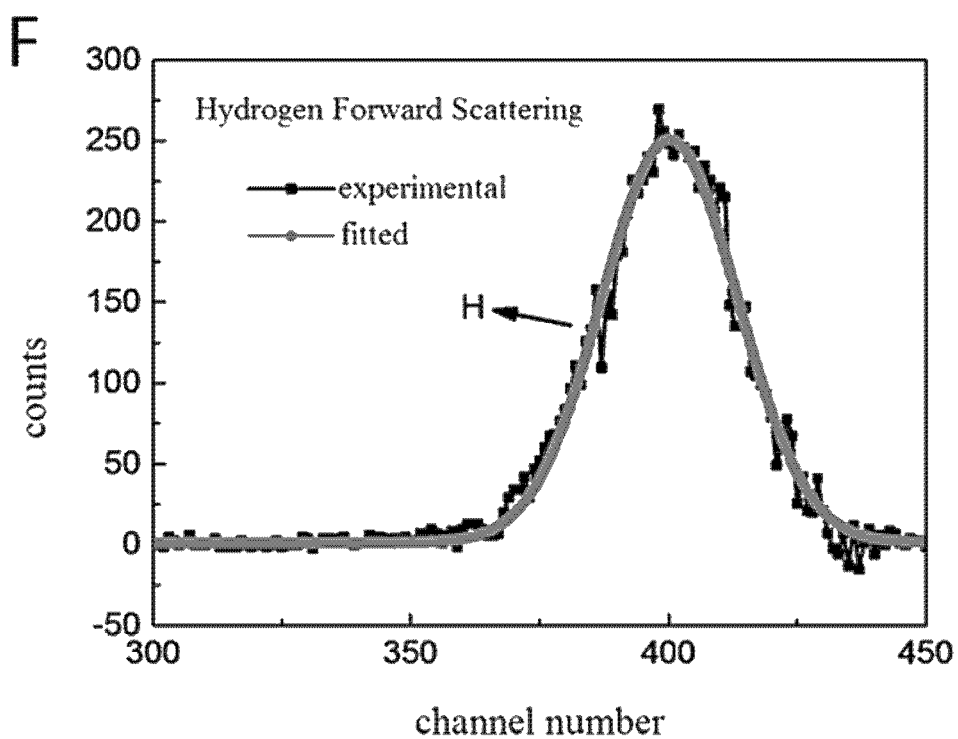
Figure 3A:
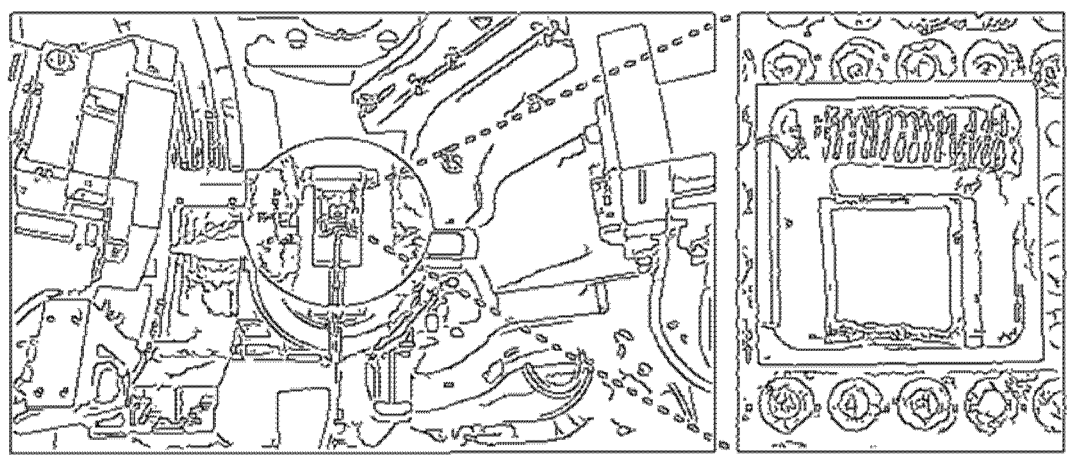
FIG. 3 is a diagram of an apparatus and a principle for a method for regulating an ionic liquid gating voltage, provided in embodiments of the present disclosure.
Figure 3B:
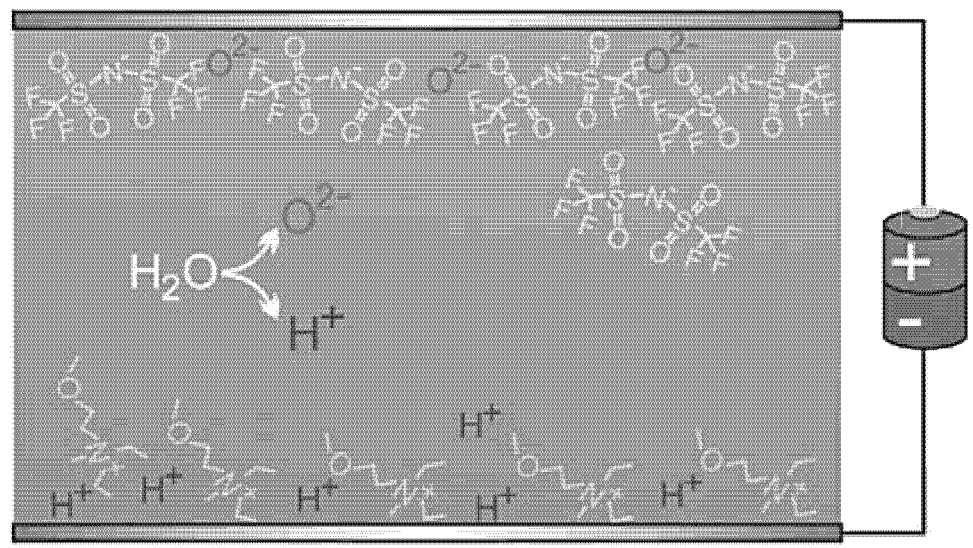
Figure 3C:
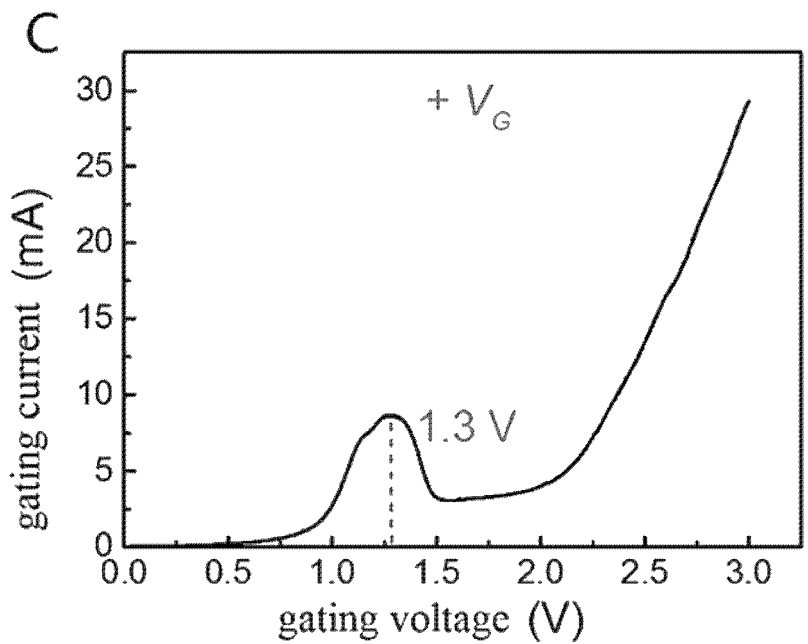
Figure 3D:
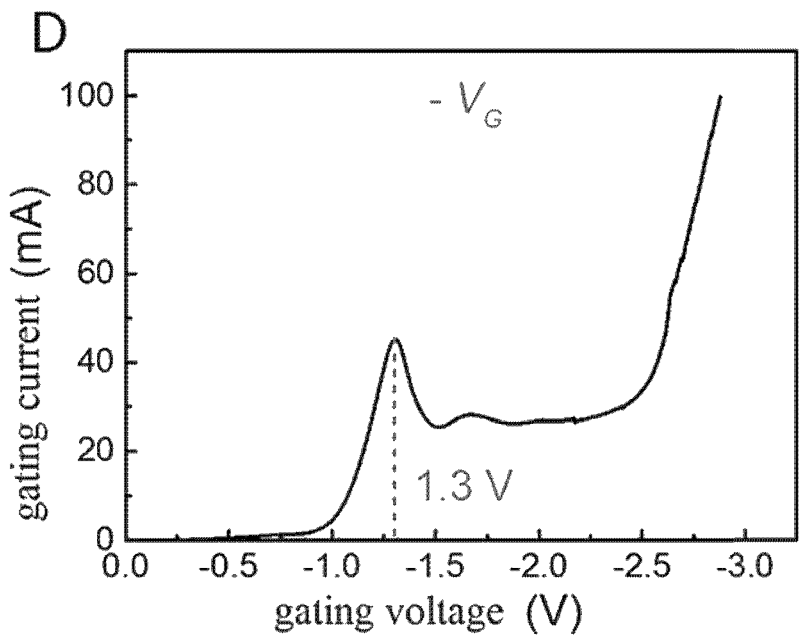

For a clear understanding of the objects, the technical solutions, and advantages of the present disclosure, the hydrogen-containing transition metal oxide and the method for making the same of the present disclosure will now be described in detail with reference to the accompanying drawings and embodiments. It is to be understood that the specific embodiments as described herein is merely to illustrate the present disclosure, and is not intended to limit the present disclosure.

Embodiments of the present disclosure include a hydrogen-containing transition metal oxide capable of achieving a tri-state phase transformation. The hydrogen-containing transition metal oxide has a structural formula of $ABO_xH_y$, wherein A is one or more of alkaline earth metal elements and rare-earth metal elements, B is one or more of transition metal elements, x is a numeric value in a range of 1 to 3, and y is a numeric value in a range of 0 to 2.5. A ratio of A and B in $ABO_xH_y$ may not be exactly 1:1, since a deviation from exact 1:1 may have occurred due to a vacancy and an interstitial atom commonly found in an oxide. Therefore, hydrogen-containing transition metal oxides having a ratio of A and B approaching 1:1 are all within the scope of the application. Preferably, x is a numeric value in a range of 1 to 3, and y is a numeric value in a range of 0 to 2.5. The alkaline earth metal elements can include Be, Mg, Ca, Sr, and Ba. The rare-earth metal elements can include La, Ce, Pr, Nd, Pm, Sm, Eu, Gd, Tb, Dy, Ho, Er, Tm, and Yb. The transition metal elements can include one or more of Co, Cr, Fe, Mn, Ni, Cu, Ti, Zn, Sc, and V. It is to be understood that A also can be an alloy of an alkaline earth metal and a rare-earth metal, and B also can be an alloy of a transition metal and a main group metal.

The hydrogen-containing transition metal oxide $ABO_xH_y$ has a stable crystal structure at a normal temperature, and an addition and a subtraction of hydrogen and an addition and a subtraction of oxygen for the hydrogen-containing transition metal oxide soaked with an ionic liquid can be achieved under an action of an electric field by using a method of regulating an ionic liquid gating voltage at a normal temperature, so as to be able to achieve: a phase transformation from a first phase to a second phase, and a phase transformation from the second phase back to the first phase; a phase transformation from the first phase to a third phase, and a phase transformation from the third phase to the first phase; and a phase transformation from the second phase to the third phase, and a phase transformation from the third phase back to the second phase. The first phase has a lattice volume larger than that of the second phase, and the second phase has a lattice volume larger than that of the third phase. It should be understood that a cyclic transformation among the above three phases can be further achieved by the method of regulating the ionic liquid gating voltage. Since the hydrogen-containing transition metal oxide has different physical properties when in the form of the above three phases, an application on an electrical device can be achieved by the transformation among the above three phases. The materials have different molecular formulas in the forms of the three phases. The material in the form of the first phase is the hydrogen-containing transition metal oxide $ABO_xH_y$. The second phase is achieved by extracting hydrogen from or inserting oxygen into the hydrogen-containing transition metal oxide $ABO_xH_y$ by the method of regulating the ionic liquid gating voltage based upon the hydrogen-containing transition metal oxide $ABO_xH_y$. The third phase is achieved by further extracting hydrogen from or inserting oxygen into the hydrogen-containing transition metal oxide $ABO_xH_y$ based on the second phase by the method of regulating the ionic liquid gating voltage based upon the hydrogen-containing transition metal oxide $ABO_xH_y$. In one embodiment, the tri-state phase transformation is to achieve a transformation among three phases $ABO_xH_y$, $ABO_{2.5}$, and $ABO_{3-\delta}$. Meanwhile, the above transformation can form a reversible structural transition among three quite different phases under a control of an electric field. Moreover, the three phases have quite different electrical, optical, and magnetic properties. The hydrogen-containing transition metal oxide, the method for making the same, the tri-state phase transformation, and the application will be described in detail below.

Referring to FIG. 1, embodiments of the present disclosure further provide a method for making the hydrogen-containing transition metal oxide, including the steps of:

S100, providing a transition metal oxide having a structural formula of $ABO_z$, wherein z is greater than or equal to 2 and smaller than or equal to 3;

S200, soaking the transition metal oxide with an ionic liquid; and

S300, applying an electric field to the transition metal oxide to cause the hydrogen ions in the ionic liquid to insert into the transition metal oxide.

In step S100, A is one or more of alkaline earth metal elements and rare-earth metal elements. B is one or more of transition metal elements Co, Cr, Fe, Mn, Ni, Cu, Ti, Zn, Sc, and V. The alkaline earth metal elements can include Be, Mg, Ca, Sr, and Ba. The rare-earth metal elements can include La, Ce, Pr, Nd, Pm, Sm, Eu, Gd, Tb, Dy, Ho, Er, Tm, and Yb. A form of the transition metal oxide having the structural formula of $ABO_z$ is not limited and can be a film, a powder, a bulk material, a nano-particle, or a material composited with other material. In one embodiment, the transition metal oxide having the structural formula of $ABO_z$ is in form of a film. It is to be understood that a method for making the film of the transition metal oxide is not limited and the film of the transition metal oxide can be made by a variety of methods.

In one embodiment, the step S100 includes the steps of:
S110, providing a substrate;
S120, depositing a film of the transition metal oxide having a structural formula of $ABO_z$ onto a surface of the substrate; and
S130, forming a first electrode on a surface of the film of the transition metal oxide.

The substrate is not limited and can be one of a ceramic substrate, a silicon substrate, a glass substrate, a metal substrate, or a polymer. Any substrate can be used for forming a film thereon can be used in the step S100. A method for forming the film of the transition metal oxide having a structural formula of $ABO_z$ is not limited and can be various film forming methods, such as an ion sputtering method, a chemical vapor deposition method, a magnetron sputtering method, a gelation method, a laser pulse deposition method, etc. In one embodiment, in step S120, the film of the transition metal oxide is obtained via an epitaxial growth on the substrate by using a pulsed laser deposition method. A thickness of the grown film of the transition metal oxide is not limited. Preferably, the film of the transition metal oxide has a thickness from 5 nm to 200 nm. In the step S130, the first electrode contacts the film of the transition metal oxide to form a bottom electrode. It is to be understood that the first electrode can be located at a surface of the film of the transition metal oxide closing the substrate, or located at a surface of the film of the transition metal oxide away from the substrate. The first electrode can be a metal or various conductive films and the film of the transition metal oxide itself. In one embodiment, the first electrode is an ITO film. The ionic liquid can be various types of ionic liquids. In one embodiment, the ionic liquid is DEME-TFSI.

In step S200, one ionic liquid layer can be formed on a surface of the transition metal oxide. The ionic liquid can be various types of ionic liquids, as long as the ionic liquid is able to provide the required hydrogen ions and oxygen ions by hydrolyzing or other manner and cover the transition metal oxide. When the transition metal oxide and the ionic liquid are in an electrical field, the hydrogen ions and the oxygen ions in the ionic liquid can be controlled to be inserted into or otherwise extracted from the transition metal oxide by a direction of the electrical field. A water amount in the ionic liquid is not limited. Experiments have proved that as long as little water (>100 ppm) is provided in the ionic liquid, the insertion and extraction of the hydrogen ions and oxygen ions can be achieved.

It is to be understood that in the step S300, a variety of methods can be used to apply the electrical field to the transition metal oxide. In one embodiment, the step S300 includes steps of:

S310, providing a second electrode and a power source;
S320, disposing the second electrode to be spaced from the first electrode, and connecting the second electrode and the first electrode electrically and respectively to the power source; and
S330, soaking the second electrode with the ionic liquid and applying an electric field in a direction from the second electrode to the first electrode by the power source.

In step S310, a shape of the second electrode is not limited. The second electrode can be a parallel-plate electrode, a rodlike electrode, or a metal mesh electrode. In one embodiment, the second electrode is an electrode consisting of a spring-like metal wire. The power source can be various direct current power sources, alternating current power sources, etc. A voltage of the power source is adjustable so as to be used for controlling a period of a reaction. In one embodiment, the power source is a direct current power source.

In step S320, the second electrode is disposed to be spaced from the first electrode, so that a directed electric field can be formed between the second electrode and the first electrode. Connection manners of the second electrode and the first electrode to the direct current power source are not limited. The application of the voltage to the first electrode and the second electrode can be controlled by a switch.

In the step S330, the second electrode is soaked with the ionic liquid. When power is applied to the first electrode and the second electrode, the first electrode can be connected to a negative pole of the direct current power source, and the second electrode can be connected to a positive pole of the direct current power source, so that the electric field with a direction pointed from the second electrode to the first electrode can be generated between the first electrode and the second electrode. Since the ionic liquid exists between the first electrode and the second electrode, the positively charged hydrogen ions in the ionic liquid will move toward the first electrode under the action of the electric field, so that the positively charged hydrogen ions are collected on the surface of the film of the transition metal oxide and further inserted into the transition metal oxide, thereby obtaining the hydrogen-containing transition metal oxide. The negatively charged oxygen ions will be extracted from the sample and enter into the ionic liquid. It is to be understood that when the electric field is inverted, the ion change process as described above will also be correspondingly inverted. Therefore, upon the change of the electric field, the process as described above is a reversible process.

Films of strontium cobalt oxides $SrCoO_xH_y$ with different hydrogen amounts and oxygen amounts can be obtained by the method of regulating the ionic liquid gating voltage. In one embodiment, the hydrogen-containing transition metal oxide $ABO_xH_y$ is $SrCo_{2.8}H_{0.82}$, $SrCoO_{2.5}H$, $SrCoO_3H_{1.95}$, or $SrCoO_{2.5}H_{2.38}$.

Referring to FIG. 2, in order to determine the hydrogen amount and oxygen amount in a $SrCoO_xH_y$ film obtained by the method as described above, hydrogen amounts and oxygen amounts in three types of $SrCoO_xH_y$ films are quantitatively measured by a method combining Hydrogen Forward Scattering with Rutherford Back Scattering. According to the measurement result, obtained ratios of Co atom to H atom in different films are 1:0.82 (FIGS. 2A and 2B), 1:1.95 (FIGS. 2C and 2D), and 1:2.38 (FIGS. 2E and 2F) respectively. Stoichiometric ratios of elements of three types of $SrCoO_xH_y$ are $SrCoO_{2.8}H_{0.82}$, $SrCoO_3H_{1.95}$, and $SrCoO_{2.5}H_{2.38}$ respectively. A topological phase transformation among three quite different phases achieved under a control of an invertible electric field can be provided for all of $SrCoO_{2.8}H_{0.82}$, $SrCoO_2H_{1.95}$, and $SrCoO_{2.5}H_{2.38}$, and these three structural phases have quite different electrical, optical, and magnetic properties. The hydro-containing transition metal oxide $ABO_xH_y$ can be $SrCoO_{2.8}H_{0.82}$, $SrCoO_{2.5}H$, $SrCoO_3H_{1.95}$, or $SrCoO_{2.5}H_{2.38}$.

Taking $SrCoO_{2.5}H$ as an example, a phase transformation among three phases $SrCoO_{2.5}$, $SrCoO_{3-\delta}$, and $SrCoO_{2.5}H$ is described as below, wherein $SrCoO_{2.5}H$ corresponds to a first phase, $SrCoO_{2.5}$ corresponds to a second phase, and $SrCoO_{3-\delta}$ corresponds to a third phase.

Referring to FIG. 3, an apparatus for controlling the phase transformation of $SrCoO_{2.5}H$ by a gating voltage is shown. A preparation of a new phase $SrCoO_{2.5}H$ and a reversible and nonvolatile transformation among the three structural phases under a control of an electric field at room temperature are achieved by using the method of regulating the ionic liquid gating voltage via the apparatus shown in FIG. 3. In FIG. 3, a silver conductive adhesive is coated as an electrode on an edge of a $SrCoO_{2.5}H$ film and a surface of the $SrCoO_{2.5}H$ film is covered by an ionic liquid. A spiral Pt electrode spaced from the silver conductive adhesive is the other electrode. In the present embodiment, an ionic liquid DEME-TFSI is used, in which the required hydrogen ions and oxygen ions for the transformation can be obtained by hydrolyzing a water molecule therein. While this effect can be generalized to other ionic liquids, ionic salts, polymers, polar materials, and so on, as long as the required hydrogen ions and oxygen ions can be obtained therefrom and enabled to be inserted into a material or extracted from a material under a drive of an electric field.

Figure 4:
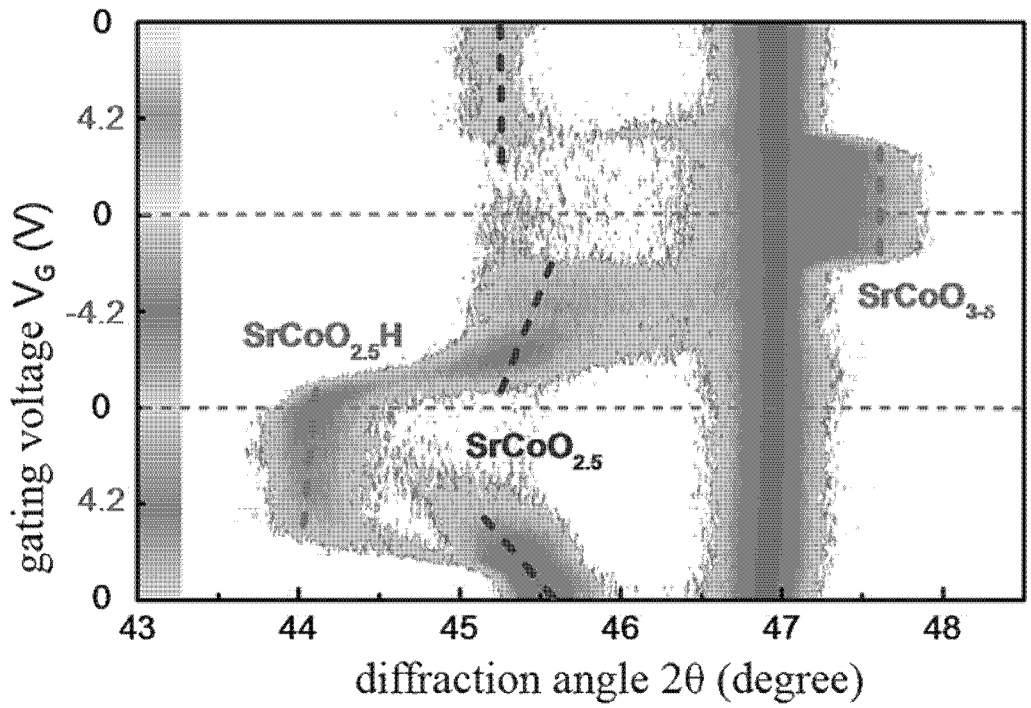
FIG. 4 shows a variation of diffraction peak of XRD in the method for regulating the ionic liquid gating voltage, wherein the corresponding phases are $SrCoO_{2.5}$, $SrCoO_{3-\delta}$, and $SrCoO_{2.5}H$, respectively.

Referring to FIG. 4, this figure shows an in situ XRD of a tri-state phase transformation controlled by the method of regulating the gating voltage. As it can be seen, in the ionic liquid, when a positive gating voltage (an increasing rate of the voltage is 2 mV/s) is applied to a $SrCoO_{2.5}$ film, the (004) diffraction peak at 45.7° diminishes gradually and eventually disappears, while a diffraction peak corresponding to the new phase starts to develop at 44.0°, suggesting that the new structural phase $SrCoO_{2.5}H$ is obtained. When gradually changing to a negative gating voltage, the new phase $SrCoO_{2.5}H$ reverts back to $SrCoO_{2.5}$ quickly, when further increasing the negative gating voltage, $SrCoO_{2.5}H$ is transformed to a $SrCoO_{3-\delta}$ phase having a perovskite structure. In addition, the structure transition can also be modulated reversibly by regulating the in situ electric field. When changing to positive gating voltages, $SrCoO_{3-\delta}$ phase reverts back to $SrCoO_{2.5}$ phase and $SrCoO_{2.5}H$ quickly. Therefore, a reversible structure transition among the $SrCoO_{2.5}$ phase having the brownmillerite structure, the $SrCoO_{3-\delta}$ phase having the perovskite structure, and the $SrCoO_{2.5}H$ phase is achieved by controlling the electric field. What is important is that these regulated new phases are nonvolatile, that is, when the electric field is removed, their structural phases and respective physical properties are still kept.

Figure 5:
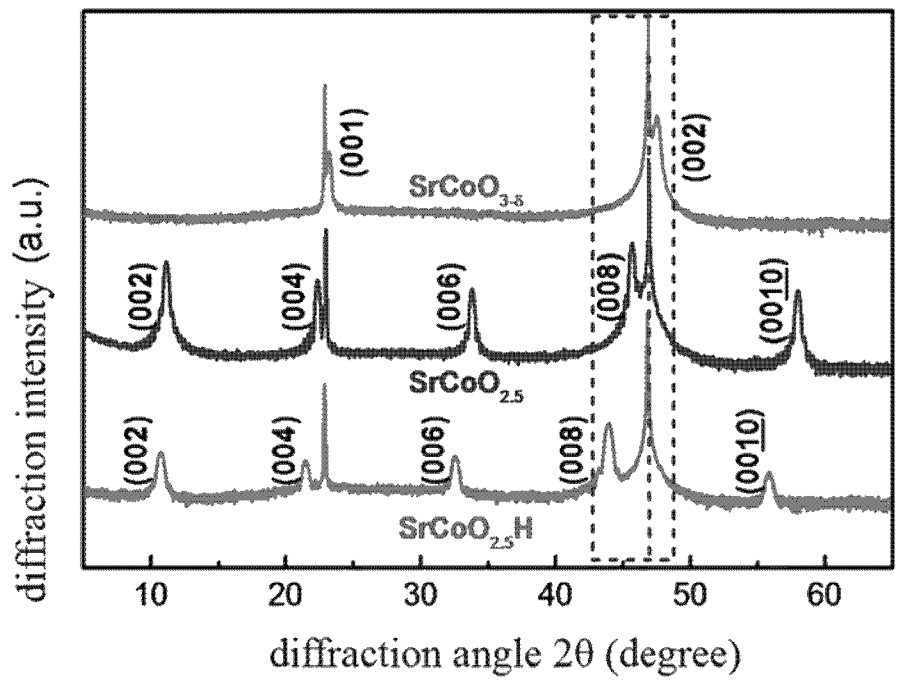
FIG. 5 shows structural characterization spectra of X-ray diffraction of $SrCoO_{2.5}$, $SrCoO_{3-\delta}$, and $SrCoO_{2.5}H$, provided in embodiments of the present disclosure.
Figures 6A, 6B, 6C:
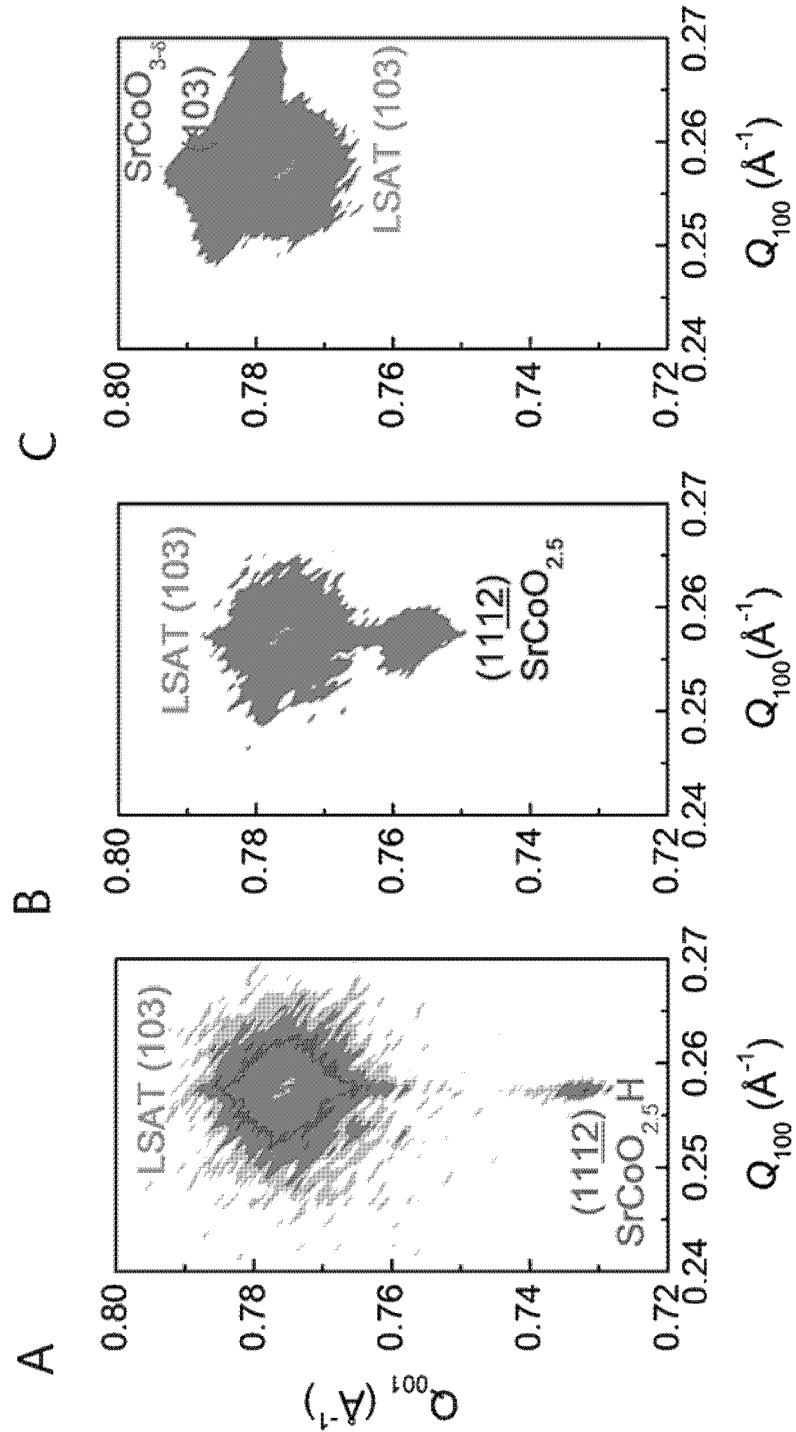
FIG. 6 shows a characterization of the crystal quality of a film before and after the regulation to the ionic liquid gating voltage, provided in embodiments of the present disclosure.
Figures 6D, 6E, 6F:
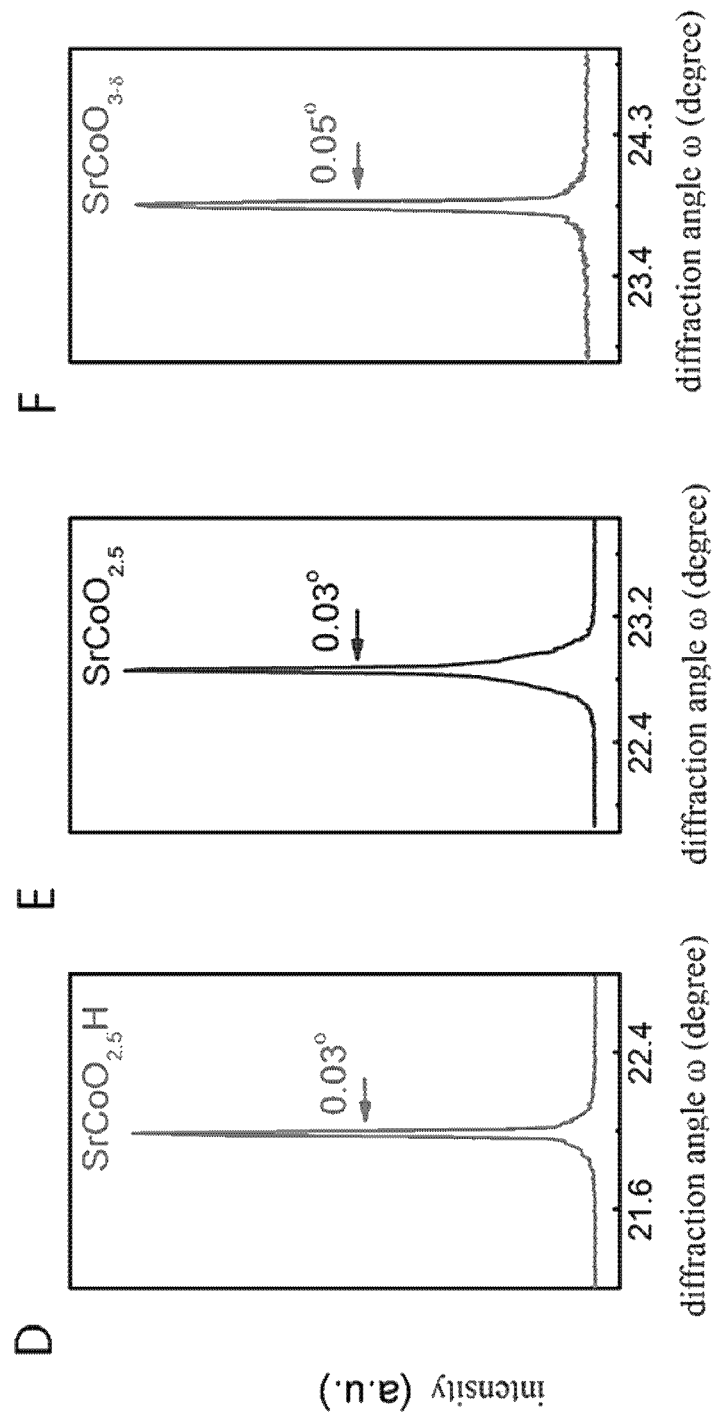
Figure 7A:
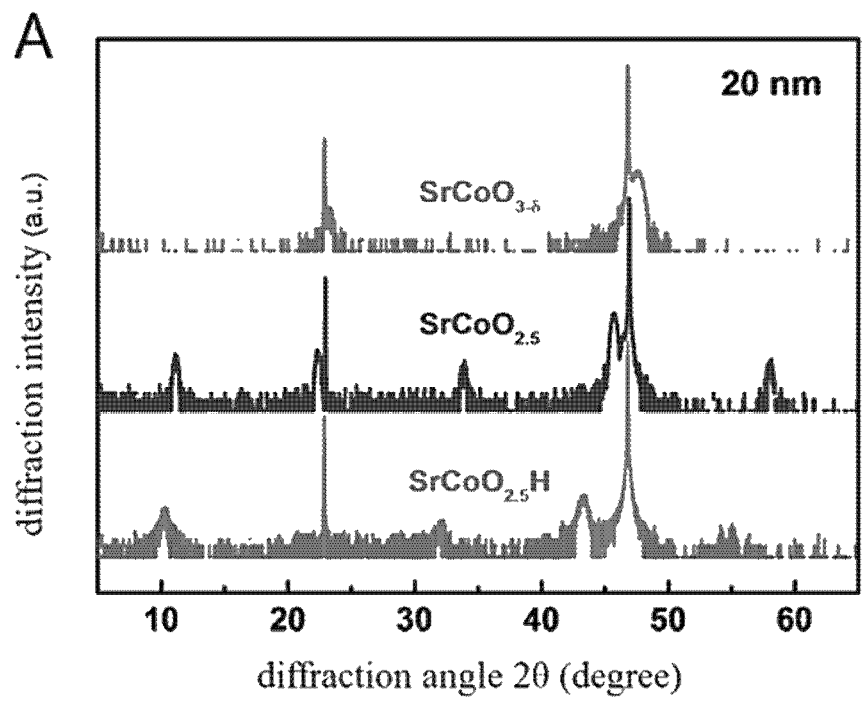
FIG. 7 shows XRD of three phases with different thicknesses, (A) 20 nm, (B) 40 nm, (C) 60 nm, and (D) 100 nm, respectively, provided in embodiments of the present disclosure.
Figure 7B:
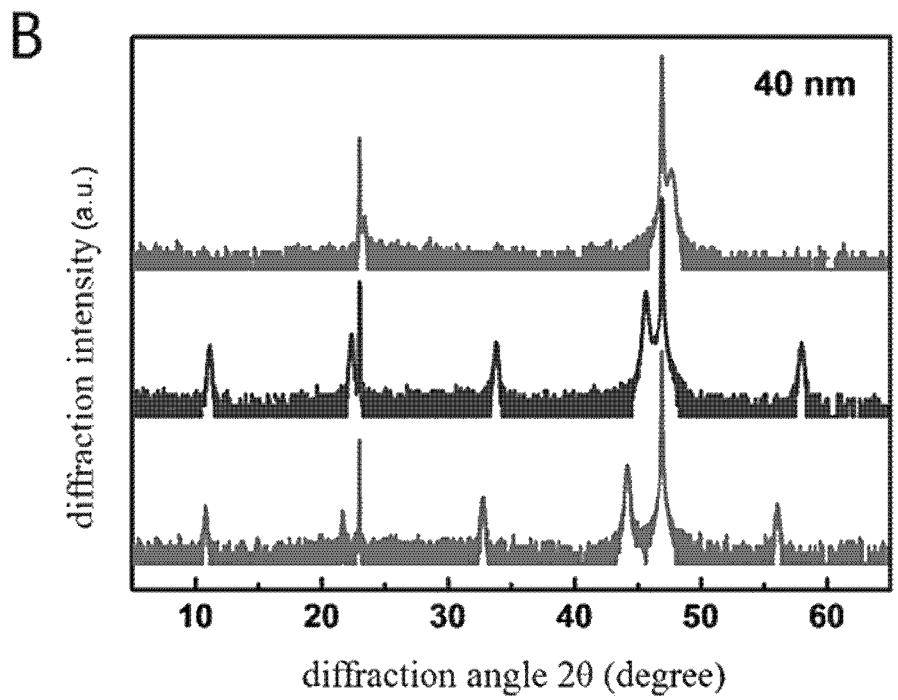
Figure 7C:
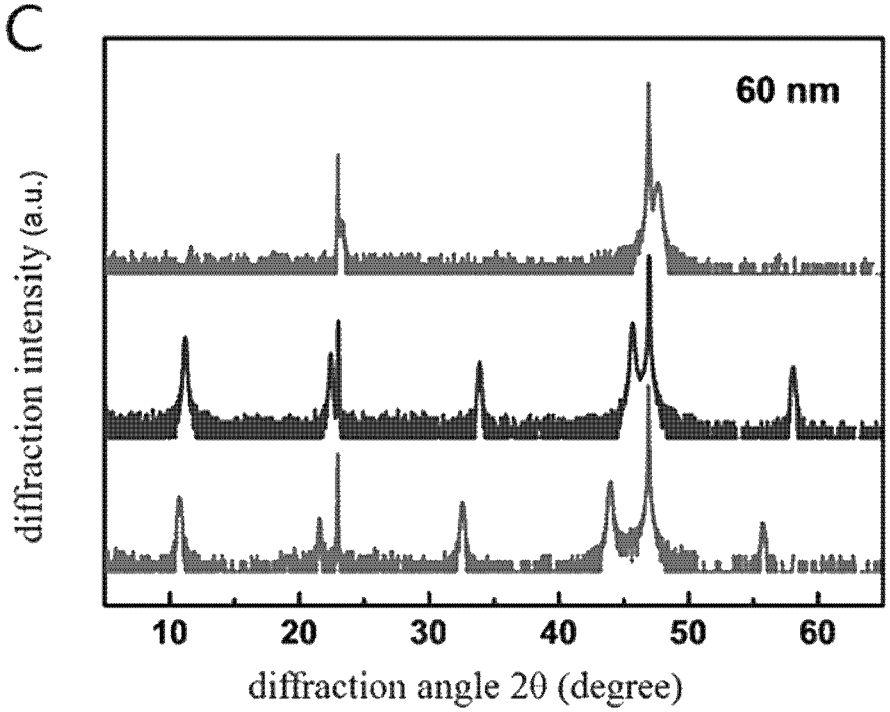
Figure 7D:
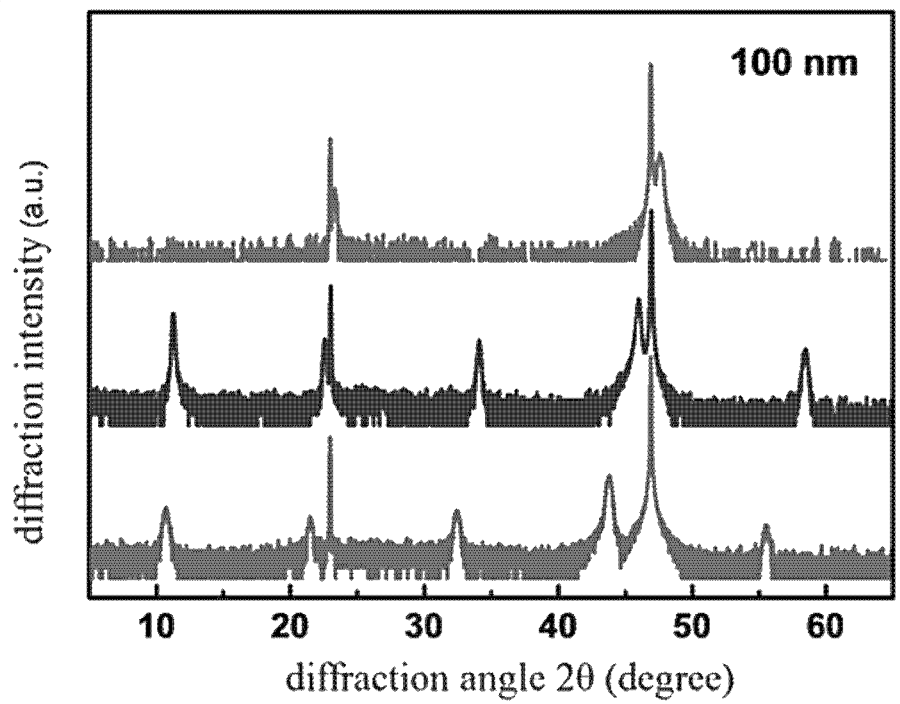
Figure 8A:
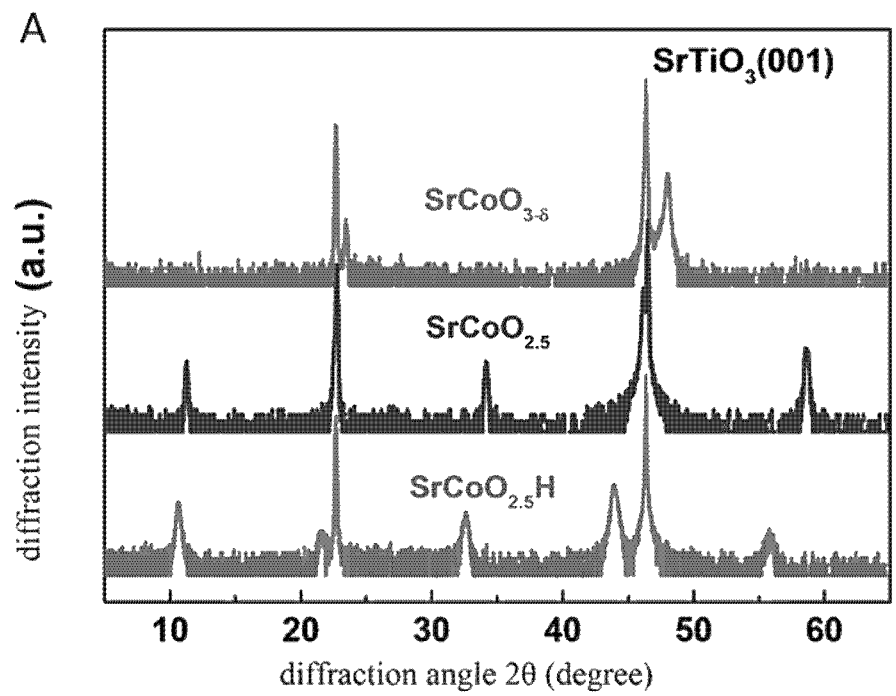
FIG. 8 shows ex-situ XRD results of the $SrCoO_{2.5}$ phase on substrates with different stresses, $SrTiO_3$ (001) (A) and $LaAlO_3$ (001) (B), after the regulation to the ionic liquid gating voltage, provided in embodiments of the present disclosure.
Figure 8B:
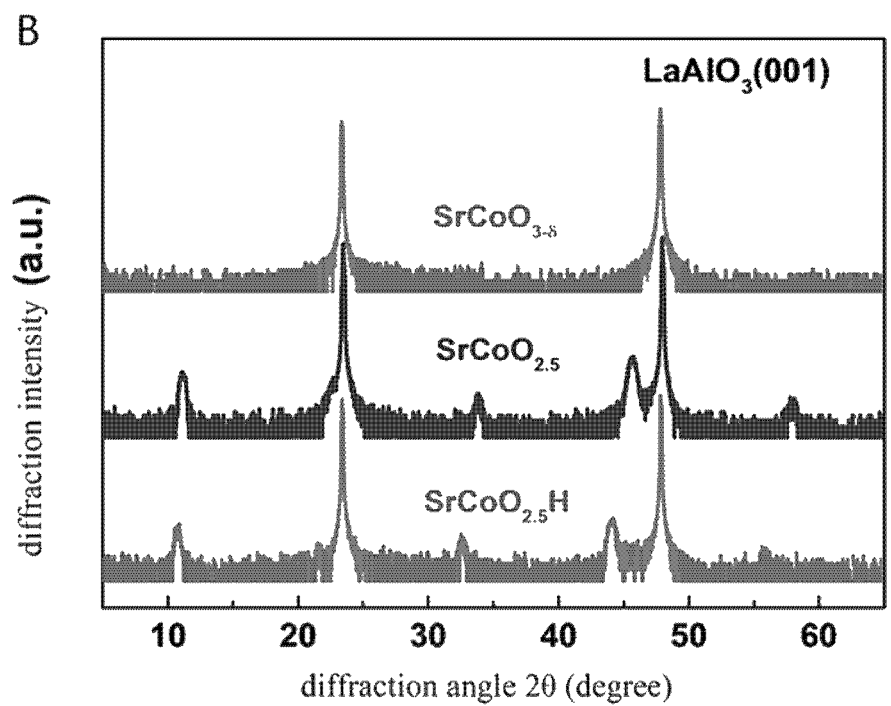

Referring to FIG. 5, X-ray diffraction patterns of three structural phases $SrCoO_{2.5}$, $SrCoO_{3-\delta}$, and $SrCoO_{2.5}H$ are shown. In comparison with the $SrCoO_{3-\delta}$ phase having the perovskite structure, the $SrCoO_{2.5}$ phase having the brownmillerite structure exhibits a superstructure peak derived from an alternating arrangement of oxygen octahedron and oxygen tetrahedron in an out-of-plane direction. Pseudocubic c-axis lattice constants of $SrCoO_{2.5}$ and $SrCoO_{3-\delta}$ structures are respectively 0.397 nm and 0.381 nm based upon respective Bragg diffraction angles. The new phase $SrCoO_{2.5}H$ also has a series of superstructure diffraction peaks, suggesting that the $SrCoO_{2.5}H$ structure has a long range periodic lattice structure the same as the $SrCoO_{2.5}$ structure. The new phase $SrCoO_{2.5}H$ has a c-axis lattice constant of 0.411 nm which increases by 3.7% and 8.0% respectively compared to these of $SrCoO_{2.5}$ and $SrCoO_{3-\delta}$. In addition, referring to FIG. 6, the three structural phases $SrCoO_{2.5}$, $SrCoO_{3-\delta}$, and $SrCoO_{2.5}H$ have almost the same rocking curve full width at half maximum (FWHM) and in-plane lattice constant identical to the substrate (in-plane Q values of reciprocal spaces are consistent), suggesting that the films after the in situ growth and gating voltage controlling still remain of high crystalline quality. Furthermore, referring to FIG. 7 and FIG. 8, films with different thicknesses (from 20 nm to 100 nm) grown on LSAT(001) and films with different stresses grown on STO(001) and LAO (001) substrates are provided, and similar results are obtained, which fully demonstrates the effectiveness and intrinsic nature of the reversible tri-state phase transformation among the three phases $SrCoO_{2.5}$, $SrCoO_{3-\delta}$, and $SrCoO_{2.5}H$. That is, this effect has no connection with a stress, a thickness or a dimension of a material and can be generalized to material systems of various structural forms.

Figure 9:
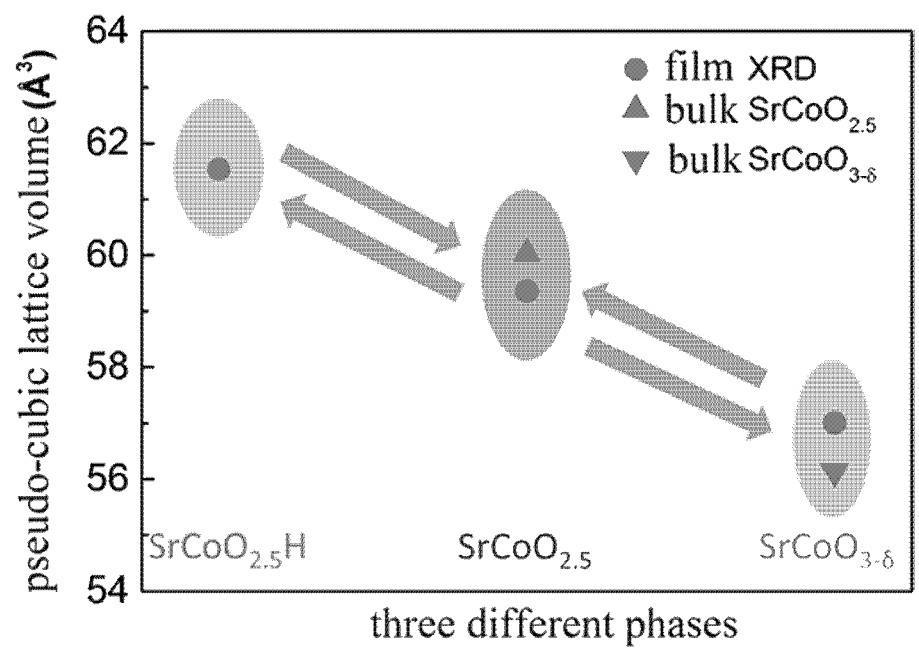
FIG. 9 shows pseudo-cubic lattice volumes obtained from XRD corresponding to the three structural phases, provided in embodiments of the present disclosure.

Referring to FIG. 9, a comparison of lattice volumes of the three structures obtained from XRD measurements with known bulk materials $SrCoO_3$ and $SrCoO_{2.5}$ is shown. It can be seen from FIG. 9 that the lattice volume of the first phase is greater than the lattice volume of the second phase, and the lattice volume of the second phase is greater than the lattice volume of the third phase.

Figure 10A:
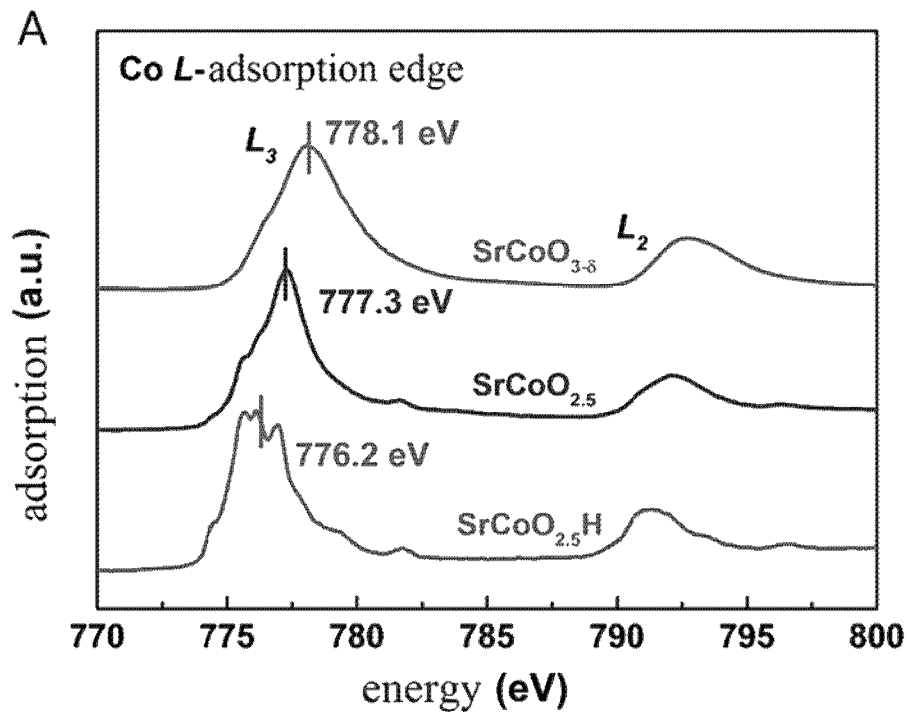
FIG. 10 shows absorption spectroscopies at an L-edge of Co (A) and at a K-edge of O (B) of the three phases, $SrCoO_{2.5}$, $SrCoO_{3-\delta}$, and $SrCoO_{2.5}H$, provided in embodiments of the present disclosure.
Figure 10B:
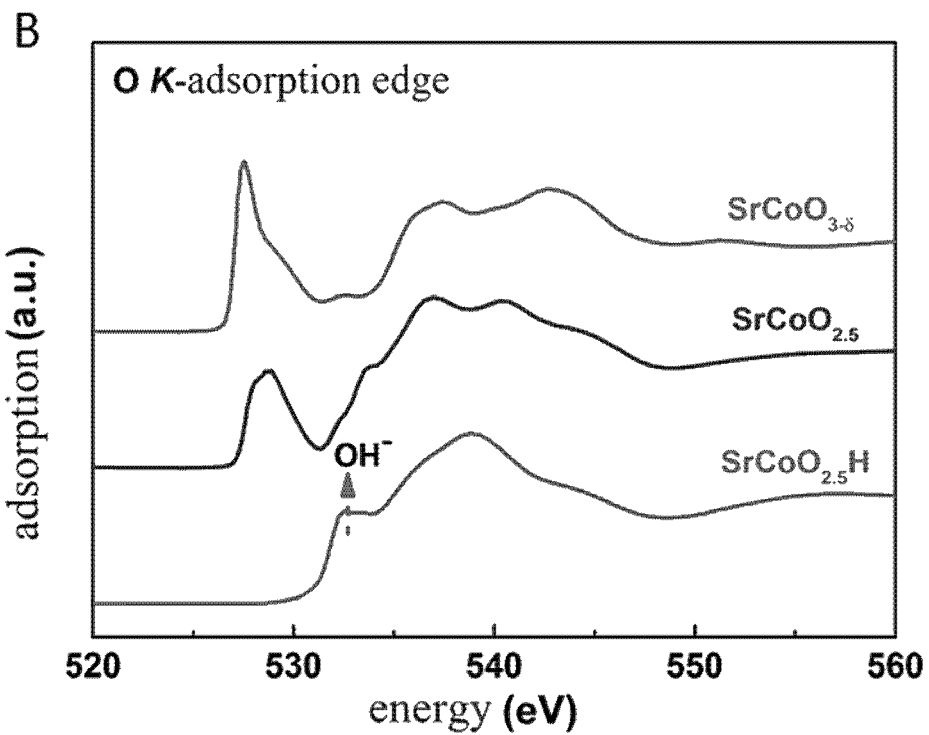

Referring to FIG. 10, the X-ray absorption spectroscopy at the L-absorption edge of Co and K-absorption edge of O in each of the three structure phases $SrCoO_{2.5}$, $SrCoO_{3-\delta}$, and $SrCoO_{2.5}H$ is measured in order to thoroughly understand the electronic structure of the new phase $SrCoO_{2.5}H$. A transition of an electron of Co from 2p orbital to 3d orbital is detected at $L_{2,3}$-absorption edge of Co and can be the basis for determining an oxidation state of corresponding compound. As shown in FIG. 10A, the peak positions of the L-absorption edges of Co are gradually shifted toward high-energy end from the new phase $SrCoO_{2.5}H$ to the $SrCoO_{2.5}$ phase and then to the $SrCoO_{3-\delta}$phase, suggesting an gradual increase in oxidation state. In particular, the new phase $SrCoO_{2.5}H$ has almost the same absorption spectroscopy characteristics, shape of the spectroscopy and peak position, as these of CoO, which suggests that Co in the new phase $SrCoO_{2.5}H$ has an oxidation state of +2. At the same time, the X-ray absorption spectroscopy of Co in the $SrCoO_{2.5}$ phase is also well in conformity with the previous studies, that is, an oxidation state of Co in the $SrCoO_{2.5}$ phase is +3. The peak position of the L3-absorption edge of Co in the $SrCoO_{3-\delta}$phase is about 0.8 eV larger than that of the $SrCoO_{2.5}$ phase, suggesting that less oxygen vacancy ($\delta<0.1$) is possessed in the $SrCoO_{3-\delta}$phase. In addition, the electronic states of the three structural phases are further studied by measuring K absorption spectroscopies of O (FIG. 10), in which K absorption of O is to measure a transition between 1s occupied orbital of O and unoccupied 2p orbital of O. Compared with K-adsorption edge of O in $SrCoO_{3-\delta}$, in the $SrCoO_{2.5}$ phase, the peak position at 527.5 eV is significantly weaken and the peak position at 528.5 eV is significantly enhanced, suggesting a transformation thereof from a complete oxygen octahedral coordination to a partial oxygen octahedral and partial oxygen tetrahedral coordination. However, in the new phase, the adsorption peak at 528 eV completely disappeared, suggesting that the oxygen-cobalt hybridization has been suppressed to a great extent.

Figure 11:
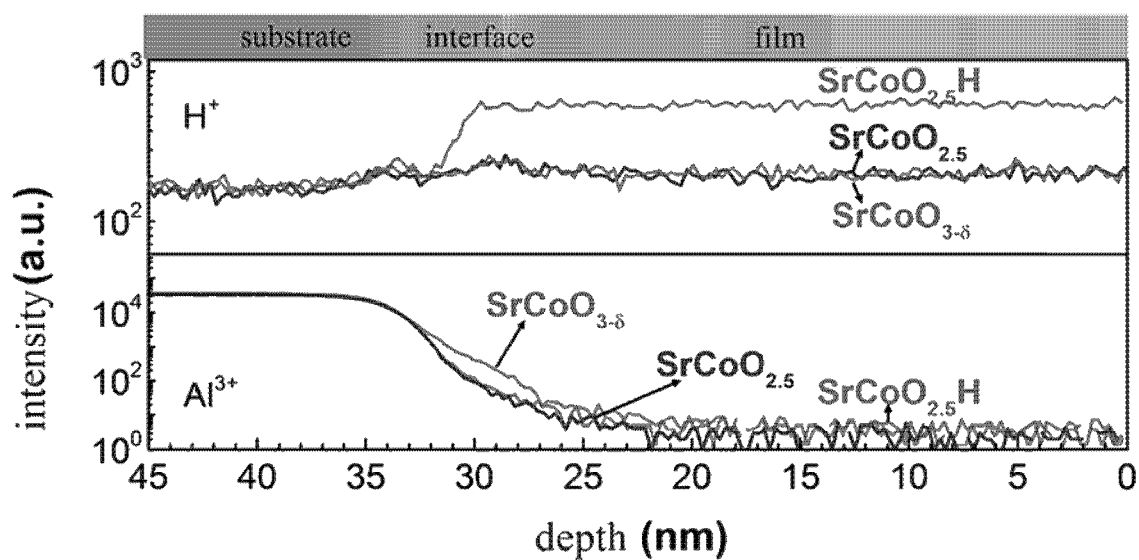
FIG. 11 shows depth dependent relationships of concentrations of H atom and Al atom in the three phases, $SrCoO_{2.5}$, $SrCoO_{3-\delta}$, and $SrCoO_{2.5}H$ measured by a secondary-ion mass spectrometry, provided in embodiments of the present disclosure.

Referring to FIG. 11, to verify the insertion of the hydrogen ions into the $SrCoO_{2.5}$ lattice, depth dependent curves of H elements and Al elements (from the LSAT substrate) in the three structural phases are measured by a secondary-ion mass spectrometry method. Compared to the LSAT substrate and the other two phases, a significant H signal in the new phase clearly verifies that a large amount of hydrogen atoms have been inserted into the $SrCoO_{2.5}$ lattice and are uniformly distributed in the new phase. According to the test of absorption spectroscopy as described above again, the experimental evidence can determine that the Co ion has an oxidation state of +2, therefore, it is determined that the new phase has a structural formula of $SrCoO_{2.5}H$. In addition, a strong assorption peak at 532.5 eV in the preposed K-adsoprtion edge of O (FIG. 11B) is resulted from O-H bond, which provided a powerful evidence for the presence of $H^+$ ion in the new phase.

Figure 12B:
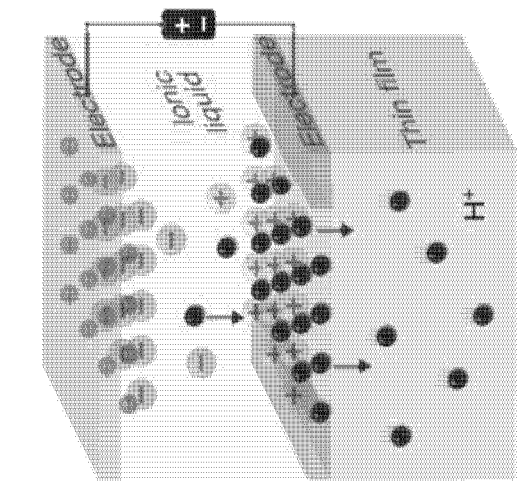
FIG. 12 shows a method for making a new phase $ABO_xH_y$, and a regulating method among three phases, provided in embodiments of the present disclosure.
Figure 12A:
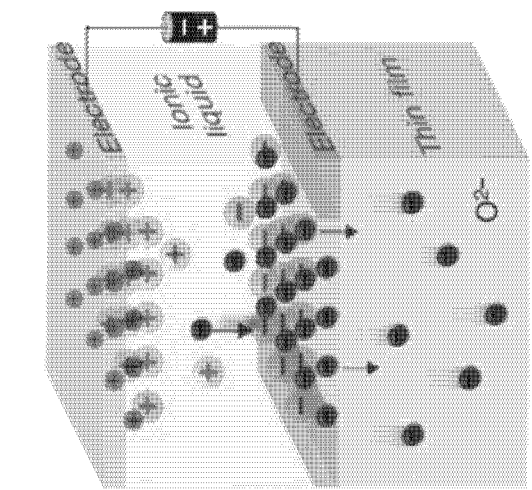
Figure 12C:
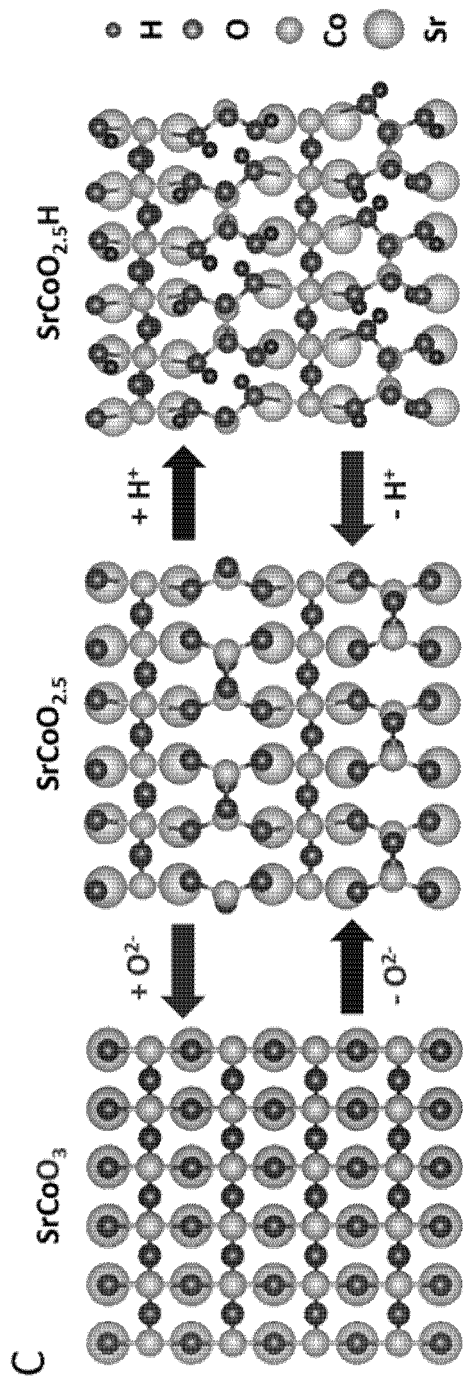

Referring to FIG. 12, a process of regulating the ionic liquid gating voltage and a reversible regulation thereof to the three phases are summarized. In this structure, $SrCoO_3$ has a perovskite structure, in which the Co ion is surrounded by oxygen ions to form a oxygen octahedral structure. $SrCoO_{2.5}$ has a brownmillerite structure. An alternating arrangement of an octahedron and a tetrahedron is formed by the material because every two Co ions loses one oxygen ion compared with $SrCoO_3$. While in $SrCoO_{2.5}H$, the hydrogen ion is connected to the oxygen ion in the oxygen tetrahedron to form a OH bond. A reversible structural transition among these three structures can be achieved by the insertion and extraction of the oxygen ions and the hydrogen ions under a drive of an electric field.

Figures 13A, 13B:
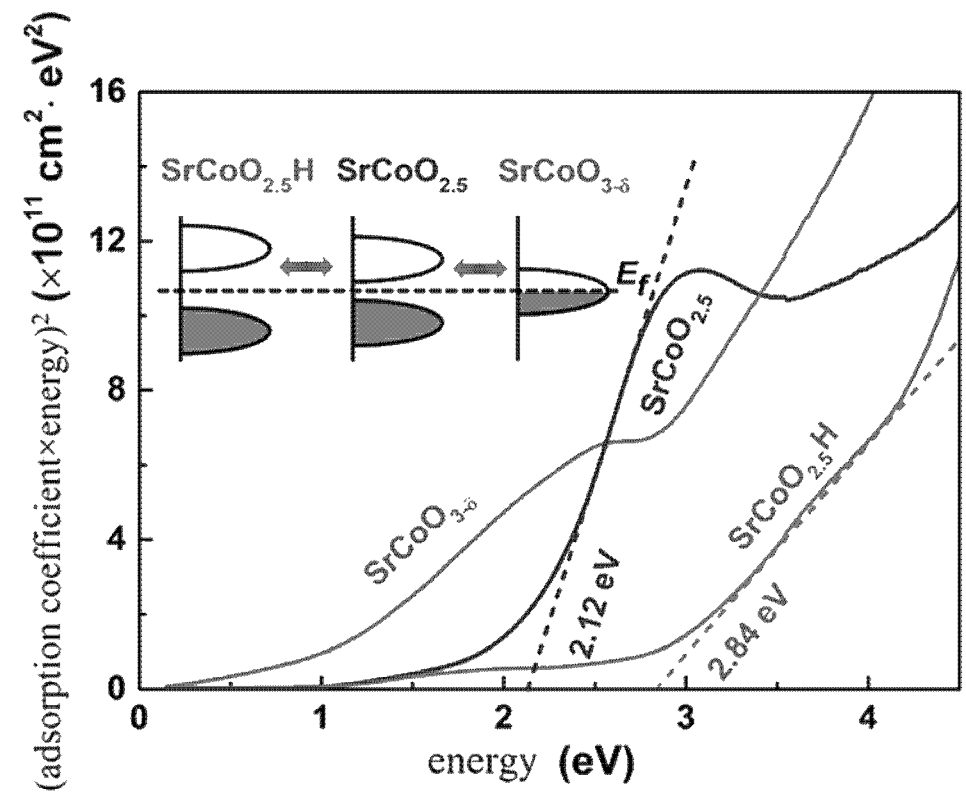
FIG. 13 shows photos of the three structural phases and a variation of the optical bandgap of the three structural phases, provided in embodiments of the present disclosure.

Referring to FIG. 13, photos of the three phases and variation of energy gaps thereof are provided. Referring to FIG. 13A, comparison of transmittance among the three different phases, $SrCoO_{2.5}$, $SrCoO_{3-\delta}$, and $SrCoO_{2.5}H$ each having a thickness of 50 nm and grown on the LSAT(001) substrate, is shown, in which $SrCoO_{2.5}H$ corresponds to the first phase, $SrCoO_{2.5}$ corresponds to the second phase, and $SrCoO_{2.5}H$ corresponds to the third phase. Images of the three structural phases can be seen from FIG. 13A. It can be found that $SrCoO_{2.5}H$ and the LSAT (001) substrate appear as colorless, $SrCoO_{2.5}$ appears as brown, while the $SrCoO_{3-\delta}$ophase appears as black. In combination with the structural transition controlled by the electric field, it can be found that this method can be a very effective mean to realize an electrochromic effect. In order to distinguish the different optical absorption properties of the three structural phases more intuitively, FIG. 13 shows the direct bandgaps of the three structural phases. Through fitting with a formula $(\alpha\omega)^2 - \omega$, it can be found that compared with $SrCoO_{3-\delta}$ having a metallic nature and $SrCoO_{2.5}$ having a semiconductor property (direct bandgap: 2.12 eV), the new phase $SrCoO_{2.5}H$ having $Co^{2+}$ has a direct bandgap reaching 2.84 eV, and the figures contained therein also show the variation of respective bandgap during the structural transition clearly.

Figure 14A:
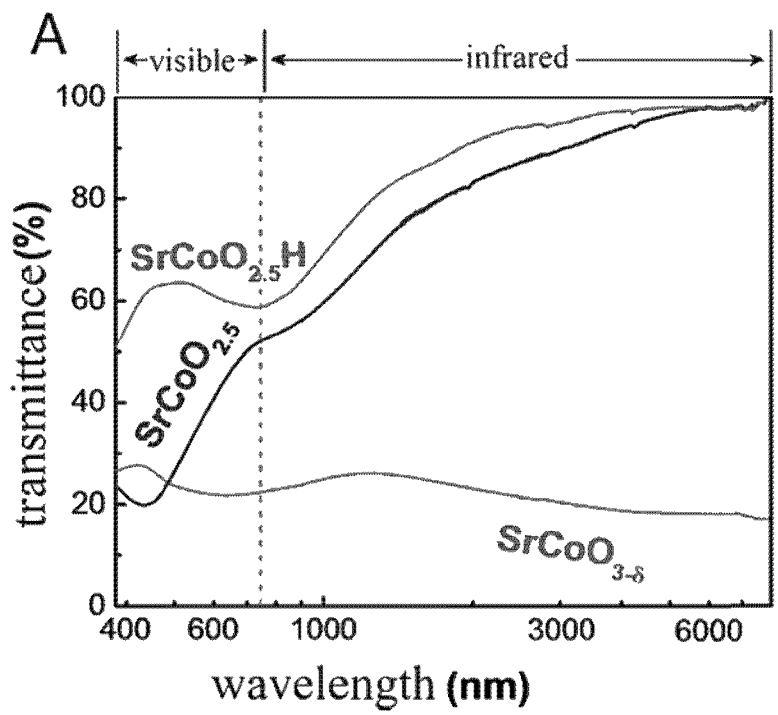
FIG. 14 shows different electrochromic transmittance spectra of the three structural phases and a schematic diagram of a smart glass, provided in embodiments of the present disclosure.
Figure 14B:
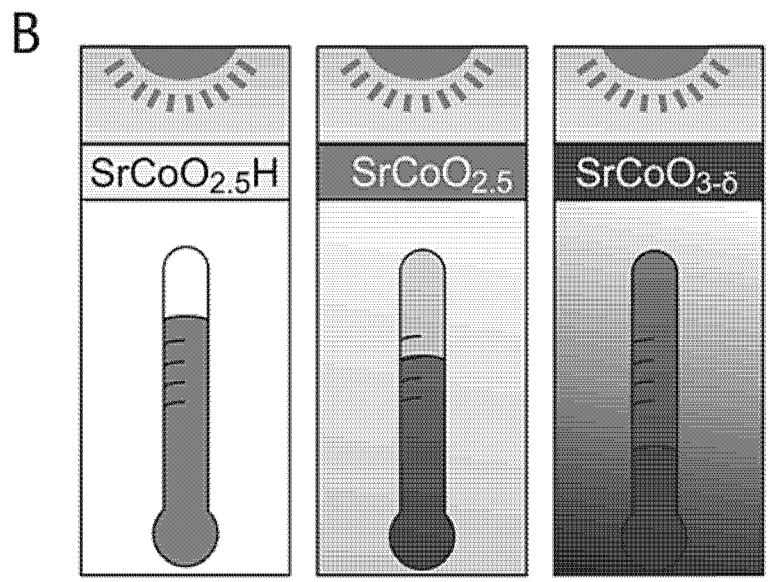

Referring to the corresponding optical transmission spectra (A) in FIG. 14, a dual-band electrochromic effect possessed by the tri-state phase transformation is also shown clearly. The $SrCoO_{2.5}H$ phase (the first phase) has a transmittance over 30% greater than these of the other two phases in the visible light region, and the transmittance of the $SrCoO_{2.5}H$ phase (the first phase) and the $SrCoO_{2.5}$ phase (the second phase) are 60% greater than that of the $SrCoO_{3-\delta}$ phase (the third phase) in the infrared region (the wavelength reaches 8000 nm). In addition, (B) in FIG. 14 shows differences in permeability and thermal effect (i.e. the principle of a smart glass) from a regulation to infrared and visible light bands. In combination with the reversible phase transformation controlled by the electric field, the $SrCoO_{2.5}H$ herein provides a great application prospect for the electrochromism, that is, an electric field regulation to a photopermeability can be performed selectively and independently at an infrared band and a visible light band by way of regulating a gate voltage. More specifically, when in the first phase (the $SrCoO_{2.5}H$ phase), for example, since the permeabilities of the infrared section and the visible light section are relatively high, it is achievable that more infrared rays and visible lights enter into a room at the same time, so that the temperature and the brightness are relatively high in the room. While when in the second phase (the $SrCoO_{2.5}$ phase), since the absorption at the visible light section is significant, a low brightness but a relatively high temperature can be achieved in the room. While when in the third phase (the $SrCoO_{3-\delta}$ phase), due to the simultaneous absorption at the visible light and infrared bands, a low brightness and a relatively high temperature can be achieved in the room. Therefore, the tri-state phase transformation realized by the material broadens the application scope of the smart glass.

Figure 15:
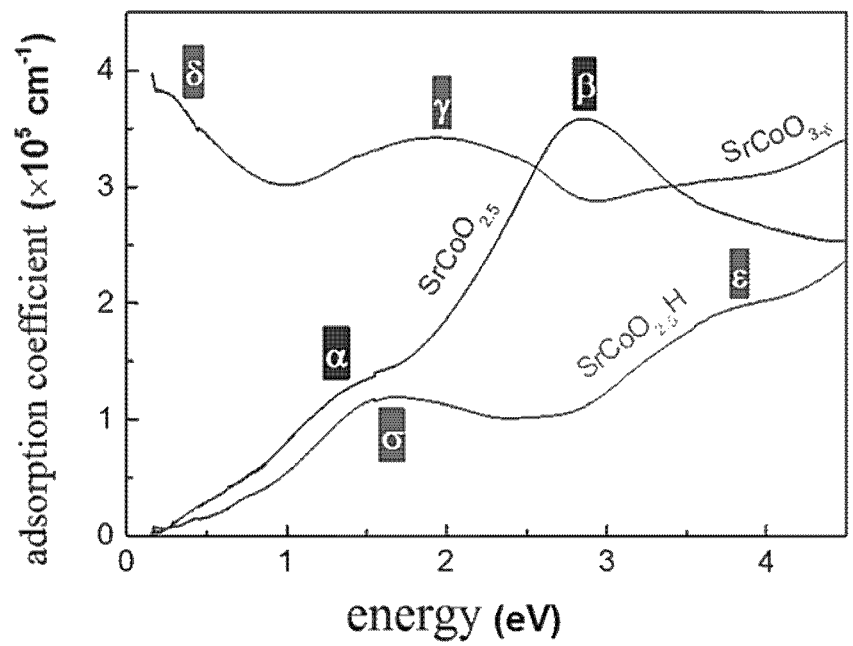
FIG. 15 shows absorption spectroscopies obtained from the transmittance spectra, provided in embodiments of the present disclosure.

Referring to FIG. 15, a comparison of absorption coefficients of optical absorption spectra obtained from the transmittance spectra of the three phases of the material of the embodiment of the present disclosure is shown. It can be seen from the figure that when in an energy range below a photon energy of 4.0 eV, there are two main absorption peaks, i.e. intraband d-d transition ($\alpha$, $\sigma$, and $\delta$) at the low energy end and interband p-d transition ($\beta$, $\epsilon$, and $\gamma$) at the high energy end, in all three structural phases. $SrCoO_{3-\delta}$ exhibits relatively strong light absorption at the whole spectrum band, which is consistent with its metallic nature. In addition, $SrCoO_{2.5}$ and $SrCoO_{2.5}H$ both exhibit an insulation property and form very strong absorptions and e) near the direct bandgaps. In addition, the light absorption by the $SrCoO_{2.5}$ phase is even greater than that by the $SrCoO_{3-\delta}$ ophase at an energy range greater than the direct bandgap, owing to a larger p-d transition in the $SrCoO_{2.5}$ phase. However, regarding to the $SrCoO_{2.5}H$ phase, the absorption is strongly suppressed with the increase of the direct bandgap.

Figure 16:
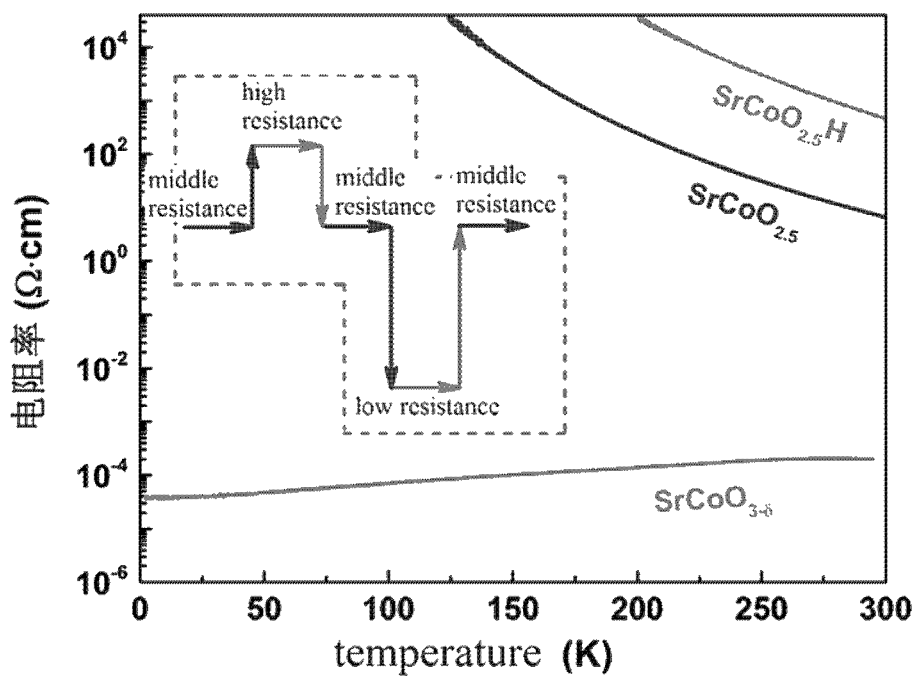
FIG. 16 shows electrical transport properties, including temperature dependence of resistivities of the three structural phases, $SrCoO_{2.5}$, $SrCoO_{3-\delta}$, and $SrCoO_{2.5}H$, provided in embodiments of the present disclosure.

Referring to FIG. 16, it can be understood that the modulation to the transmittance spectra is derived from differences in energy band structure between the three different phases, which can be also reflected on the electrical transport. FIG. 16 shows the temperature dependence of resistivities of the three structure phases, from which it can be seen that $SrCoO_{3-\delta}$ is a good metal and has a resistivity of about 200 $\mu\Omega\cdot cm$, and the $SrCoO_{2.5}$ phase and the $SrCoO_{2.5}H$ phase both show semiconductor behaviors and have resistivities of 8 $\Omega\cdot cm$ and 450 $\Omega\cdot cm$ respectively at room temperature. The inserted figure shows a reversible transformation among different resistance states among the three structural phases under the regulating of the electric field, i.e. middle resistance state high resistance state middle resistance state low resistance state middle resistance state. Therefore, the electric-field-controlled phase transformation among multi-resistance states realized by the present disclosure establishes a model device unit based on a resistance switching memory.

Figure 17A:
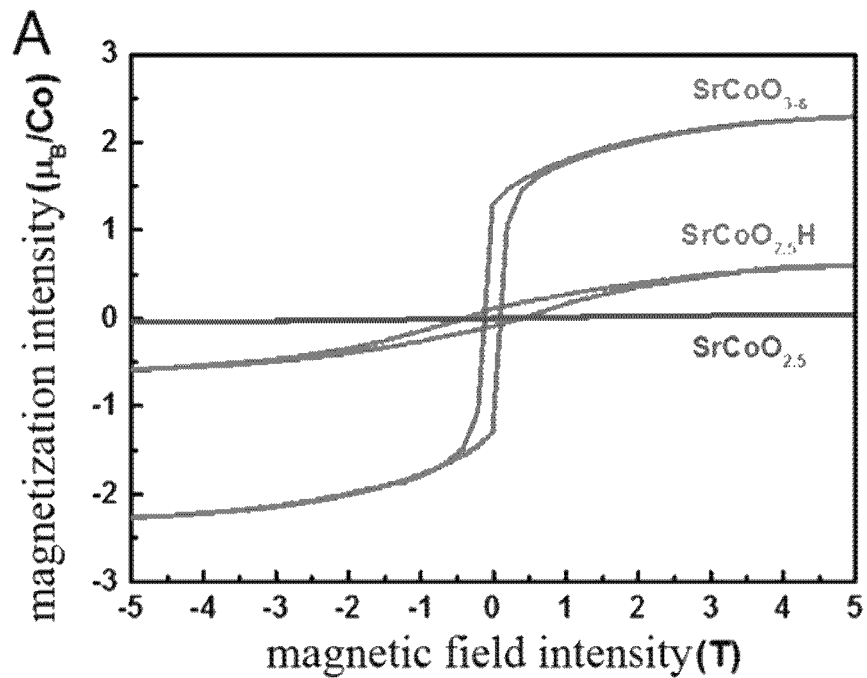
FIG. 17 shows magnetic characterizations of the three structural phases provided in embodiments of the present disclosure.
Figure 17B:
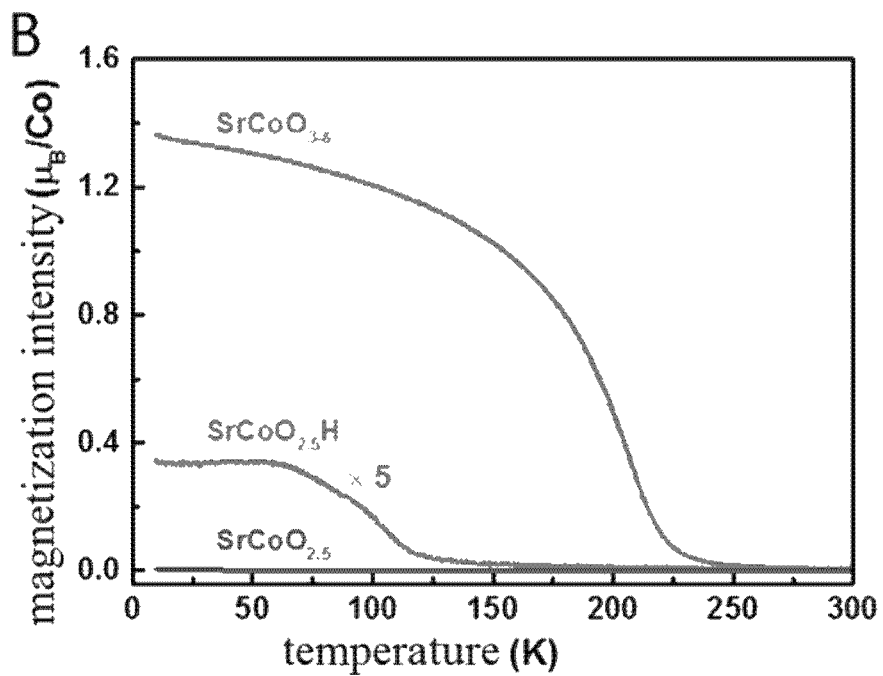

Referring to FIG. 17, a tri-state magnetoelectric coupling phenomenon closely associated with the structural transition is shown, that is, the magnetic property of the material can be regulated by an electric field to achieve a multi-states magnetic memory. Through a macroscopic magnetic measurement, the obtained saturation magnetic moment of the $SrCoO_{3-\delta}$ phase is 2.4 $\mu_B/Co$, the Curie temperature of the $SrCoO_{3-\delta}$ phase is 240 K, while $SrCoO_{2.5}$ only exhibits the intrinsic antiferromagnetic behavior of the material. In addition, in FIG. 17, the $SrCoO_{2.5}H$ phase also exhibits an obvious hysteresis loop, the saturation magnetic moment of the $SrCoO_{2.5}H$ phase is 0.6 $\mu_B/Co$, and the Curie temperature of the $SrCoO_{2.5}H$ phase is 125 K.

Figure 18:
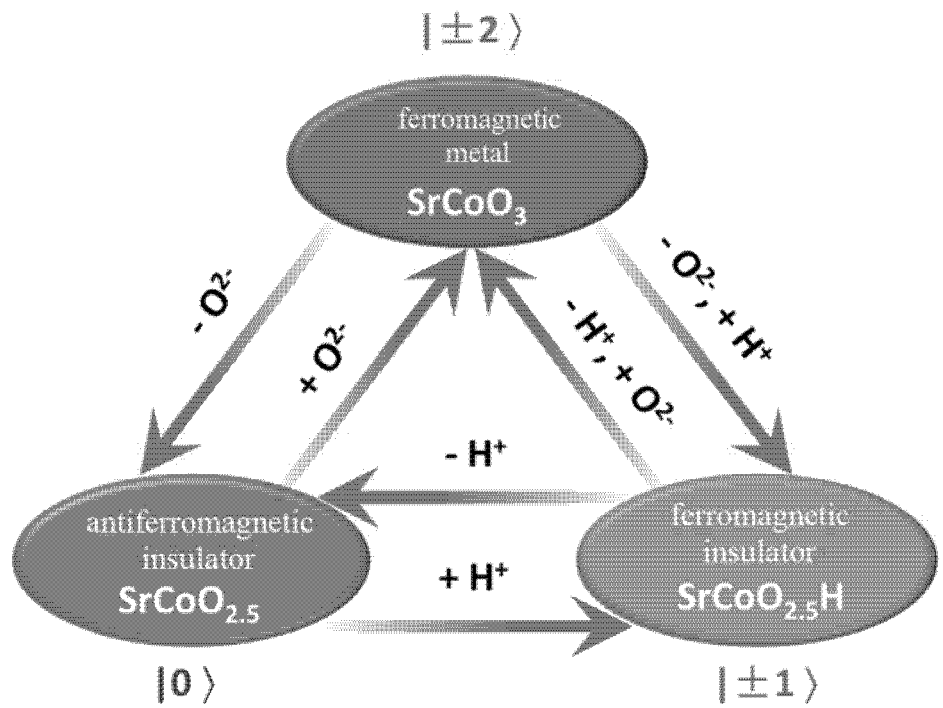
FIG. 18 shows a multi-state magnetoelectric coupling effect among the three structural phases, $SrCoO_{2.5}$ with a property of an antiferromagnetic insulator, $SrCoO_{2.5}H$ with a property of a ferromagnetic insulator, and $SrCoO_{3-\delta}$ with a property of a ferromagnetic metal, provided in embodiments of the present disclosure.

Referring to FIG. 18, this figure illustrates a regulation among three electrical and magnetic states resulting from the insertion/extraction of the oxygen ions and the hydrogen ions controlled by the electric field, which provides a new tri-state magnetoelectric coupling mechanism with a potential application value for a next generation electron device the magnetic property of which is controlled by an electric field.

Figure 19:
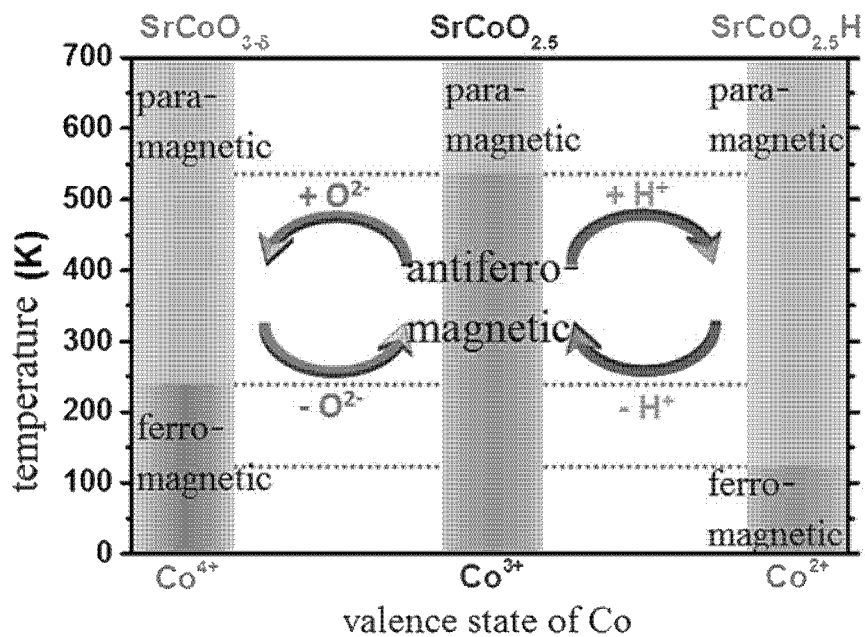
FIG. 19 shows a magnetoelectric coupling corresponding to a phase transformation of different magnetic ground states at different temperatures, provided in embodiments of the present disclosure.

Referring to FIG. 19, this figure shows that a transformation among magnetic properties at different temperatures is achieved by controlling the phase transformation or the oxidation state of Co via the electric field. For example, a ferromagnetic-antiferromagnetic-ferromagnetic transformation can be achieved at a temperature below 125 K; while a ferromagnetic-antiferromagnetic-paramagnetic transformation can be achieved between 125 k and 250 K; and a paramagnetic-antiferromagnetic-paramagnetic transformation can be achieved between 250 K and 537 K. In practical application, a switch among different magnetic ground states at different temperatures can be achieved by a method of controlling a movement of ions or the phase transformation via the electric field, thereby greatly enriching a range and a content of an electric control of magnetism.

Figure 20:
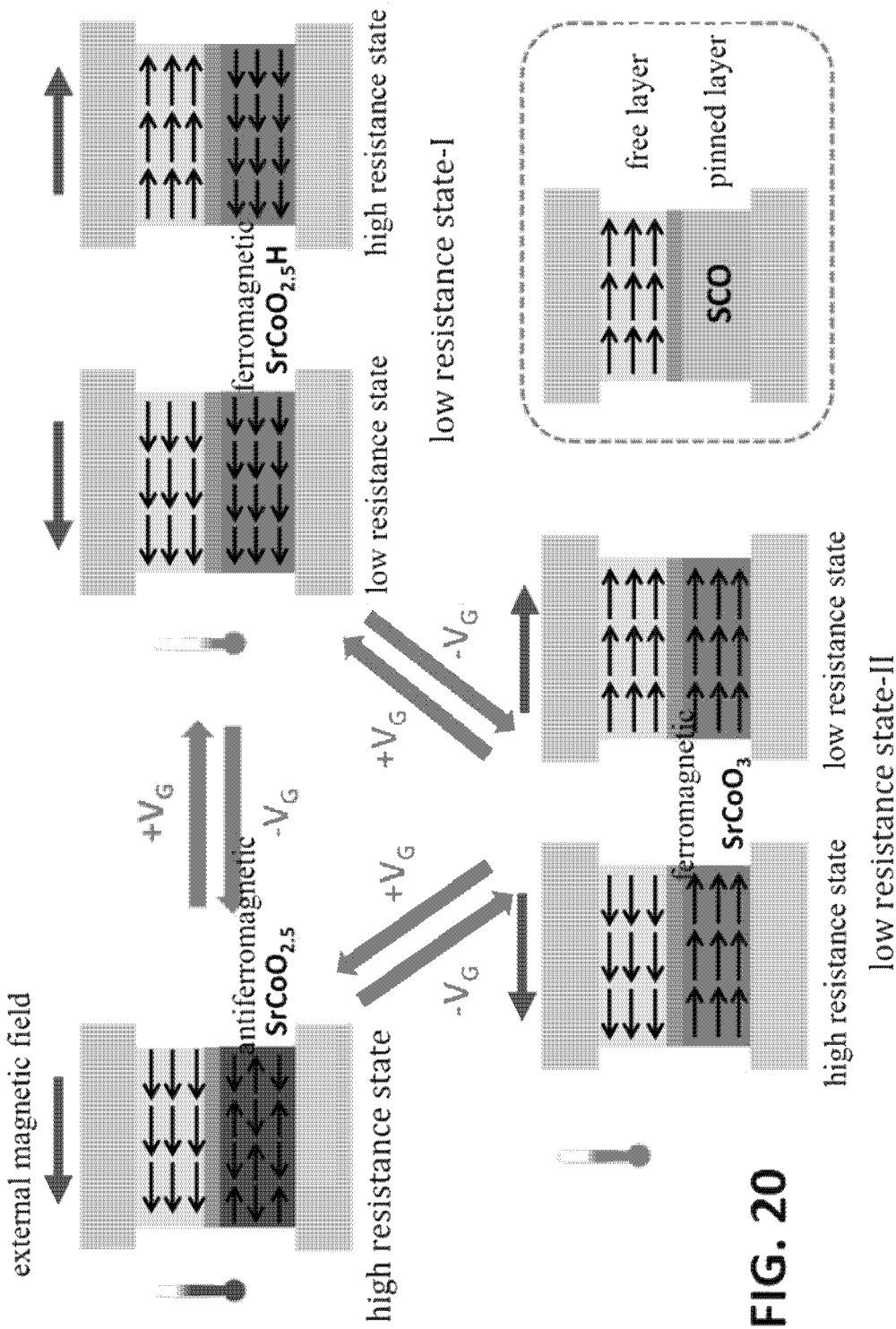
FIG. 20 shows a model of penta-state memory established upon the magnetoelectric coupling effect and spin value structure.

Referring to FIG. 20, a model of penta-state memory is established according to the magnetoelectric coupling and spin electronic effect on basis of the regulation to the magnetic ground states of the three phases. A spin-valve structure is established by using the three phases of $SrCoO_xH_y$ having different spin ground states as a spin pinned layer and an epitaxial magnetic metal as a spin free layer. When regulating the gating voltage and magnetic ground state, a high resistance state, a low resistance state-I, and a low resistance state-II can be achieved, wherein the low resistance states are each further distinguished into a high resistance state and a low resistance state, thereby realizing the penta-state memory finally.

Figure 21:
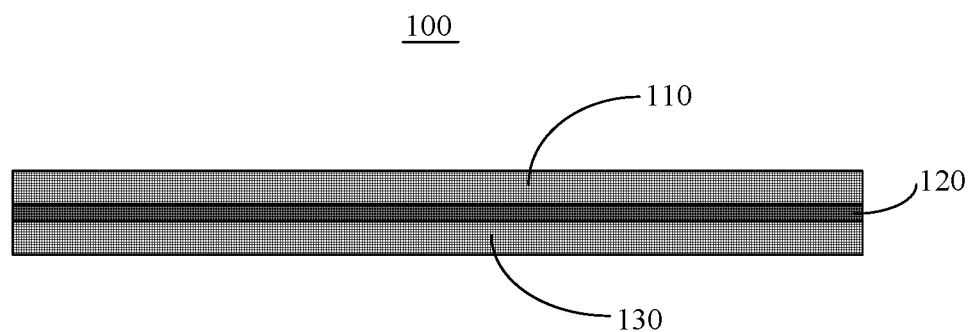
FIG. 21 is a structure schematic diagram of a primary battery, provided in embodiments of the present disclosure.

Referring to FIG. 21, embodiments of the present disclosure further provide a primary battery 100, including a cathode electrode 110 and an anode electrode 130 spaced from each other and an electrolyte 120 disposed between the cathode electrode 110 and the anode electrode 130. The cathode electrode 110 and the anode electrode 130 are the hydrogen-containing transition metal oxide having the structural formula of AB $O_xH_y$ provided in the embodiments of the present disclosure. The electrolyte 120 is not limited. Any existing conductive electrolyte having sufficient oxygen ions and (or) hydrogen ions can be used.

Figure 22:
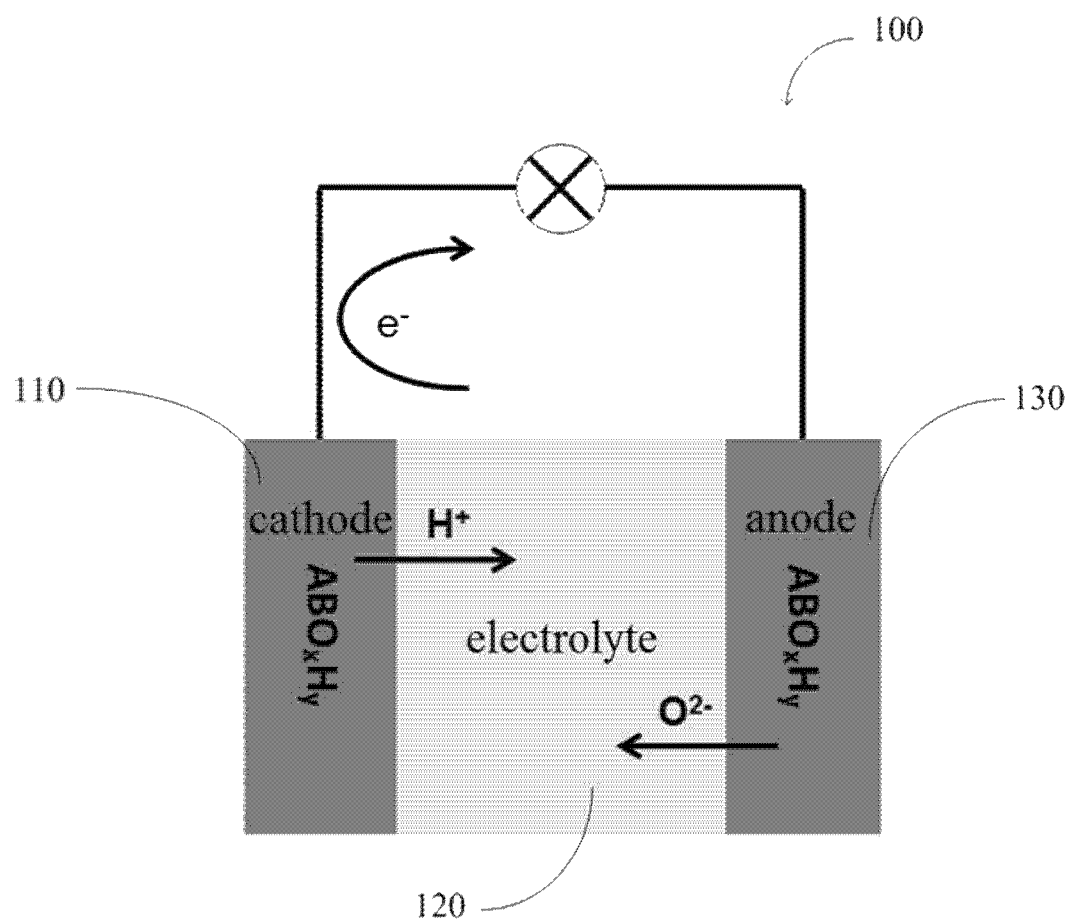
FIG. 22 is a working principle schematic diagram of the primary battery, provided in embodiments of the present disclosure.

Referring to FIG. 22, a working principle of the primary battery 100 is illustrated.

Based upon the reversible phase transformation, the primary battery 100 is a primary cell with the hydrogenated product (the first phase) and the oxidized product (the second phase) as materials of electrodes. In a discharge process, the anode electrode 130 and the cathode electrode 110 discharge $H^+$ ion and $O^{2-}$ ion respectively, the $H^+$ ion and the $O^{2-}$ ion are combined to form $H_2O$, which is simultaneously accompanied by a generation of electric current. In a charge process, $H_2O$ is hydrolyzed under an action of an electric field, the anode electrode 130 and the cathode electrode 110 are respectively hydrogenated and oxidized reversibly to re-generate the original product. Therefore, a reversible charge and discharge can be achieved by the primary battery based on the reversible phase transformation.

What is described above are only several implementations of the present application, and these embodiments are specific and detailed, but not intended to limit the patent scope of the present application. It should be understood by the skilled in the art that various modifications and improvements can be made without departing from the conception of the present application, and all fall within the protection scope of the present application. It will also be appreciated that some of the steps of the methods of the present application may be performed in parallel or in a different order than illustrated. Therefore, the patent protection scope of the present application is defined by the appended claims.

What is claimed is:

1. A hydrogen-containing transition metal oxide, having a structural formula of $SrCoO_xH_y$, wherein x is a numeric value in a range of 1 to 3, and y is a numeric value larger than 0 and smaller than or equal to 2.5, wherein H in the $SrCoO_xH_y$ has an oxidation state of +1 and is connected to an oxygen ion in a cobalt-oxygen tetrahedron of the $SrCoO_xH_y$ to form a OH bond.

2. The hydrogen-containing transition metal oxide of claim 1, wherein x is 2.5.

3. The hydrogen-containing transition metal oxide of claim 1, having a structural formula of $SrCoO_{2.8}H_{0.82}$, $SrCoO_{2.5}H$, $SrCoO_3H_{1.95}$, or $SrCoO_{2.5}H_{2.38}$.

4. A method for making the hydrogen-containing transition metal oxide of claim 1, the method comprising:
providing a transition metal oxide having a structural formula of $SrCoO_z$, wherein z is greater than or equal to 2 and smaller than or equal to 3;
soaking the transition metal oxide with an ionic liquid, wherein water in the ionic liquid is capable of being decomposed into hydrogen ions and oxygen ions under an action of an electric field; and
applying an electric field to the transition metal oxide to cause the hydrogen ion in the ionic liquid to insert into the transition metal oxide.

5. The method of claim 4, wherein the providing the transition metal oxide comprises:
providing a substrate;
depositing a film of the transition metal oxide having the structural formula of $SrCoO_z$ onto a surface of the substrate; and
forming a first electrode on a surface of the film of the transition metal oxide.

6. The method of claim 5, wherein the substrate is one of a ceramic substrate, a silicon substrate, a glass substrate, a metal substrate, or a polymer.

7. The method of claim 5, wherein the film of the transition metal oxide is obtained via an epitaxial growth on the surface of the substrate by using a pulsed laser deposition method.

8. The method of claim 5, wherein the first electrode contacts the film of the transition metal oxide to form a bottom electrode.

9. The method of claim 5, wherein the applying the electric field to the transition metal oxide comprises:
providing a second electrode and a power source;
disposing the second electrode to be spaced from the first electrode and connecting the second electrode and the first electrode electrically and respectively to the power source; and
soaking the second electrode with the ionic liquid and applying an electric field in a direction from the second electrode to the first electrode by the power source.

10. A primary battery, comprising:
a cathode electrode;
an anode electrode spaced from the cathode electrode; and
an electrolyte disposed between the cathode electrode and the anode electrode;
wherein at least one of the cathode electrode and the anode electrode is a hydrogen-containing transition metal oxide having a structural formula of $SrCoO_xH_y$, wherein x is a numeric value in a range of 1 to 3, and y is a numeric value larger than 0 and smaller than or equal to 2.5, wherein H in the $SrCoO_xH_y$ has an oxidation state of +1 and is connected to an oxygen ion in a cobalt-oxygen tetrahedron of the $SrCoO_xH_y$ to form a OH bond.

11. The primary battery of claim 10, wherein x is 2.5.

12. The primary battery of claim 10, the hydrogen-containing transition metal oxide is $SrCoO_{2.8}H_{0.82}$, $SrCoO_{2.5}H$, $SrCoO_3H_{1.95}$, or $SrCoO_{2.5}H_{2.38}$.

13. The hydrogen-containing transition metal oxide of claim 1, having a structural formula of $SrCoO_{2.5}H$.

14. The primary battery of claim 10, the hydrogen-containing transition metal oxide is $SrCoO_{2.5}H$.

* * * * *